(12) United States Patent
Obermeyer

(10) Patent No.: US 9,019,143 B2
(45) Date of Patent: Apr. 28, 2015

(54) SPECTROMETRIC SYNTHETIC APERTURE RADAR

(76) Inventor: Henry K. Obermeyer, Wellington, CO (US)

(*) Notice: Subject to any disclaimer, the term of this patent is extended or adjusted under 35 U.S.C. 154(b) by 310 days.

(21) Appl. No.: 12/079,062

(22) Filed: Nov. 30, 2007

(65) Prior Publication Data
US 2009/0102705 A1    Apr. 23, 2009

Related U.S. Application Data

(60) Provisional application No. 60/874,397, filed on Nov. 30, 2006.

(51) Int. Cl.
*G01S 13/90* (2006.01)
*H01Q 1/28* (2006.01)
*H01Q 11/10* (2006.01)

(52) U.S. Cl.
CPC .............. *G01S 13/90* (2013.01); *G01S 13/9023* (2013.01); *G01S 2013/9064* (2013.01); *G01S 2013/9076* (2013.01); *H01Q 1/28* (2013.01); *H01Q 11/10* (2013.01)

(58) Field of Classification Search
USPC ........... 342/25 R, 25 A–25 F; 343/705, 792.5
See application file for complete search history.

(56) References Cited

U.S. PATENT DOCUMENTS

| | | | | |
|---|---|---|---|---|
| 2,954,557 A * | 9/1960 | Yang | ............................. | 343/756 |
| 3,271,774 A * | 9/1966 | Justice | ........................ | 343/792.5 |
| 3,271,775 A * | 9/1966 | Yang | .......................... | 343/792.5 |
| 3,500,419 A * | 3/1970 | Sleeper, Jr. et al. | ........... | 343/725 |
| 3,550,138 A * | 12/1970 | Guertler et al. | ............... | 343/751 |
| 4,258,366 A * | 3/1981 | Frosch et al. | .................. | 343/786 |
| 4,771,287 A * | 9/1988 | Mims | .......................... | 342/25 A |
| 4,866,446 A * | 9/1989 | Hellsten | ...................... | 342/25 A |
| 4,965,582 A * | 10/1990 | Hellsten | ...................... | 342/25 A |
| 5,212,494 A * | 5/1993 | Hofer et al. | .................... | 343/859 |
| 6,091,374 A * | 7/2000 | Barnes | .......................... | 343/787 |
| 6,211,839 B1 * | 4/2001 | Campbell | ................. | 343/792.5 |
| 6,271,799 B1 * | 8/2001 | Rief et al. | ..................... | 343/776 |
| 6,400,329 B1 * | 6/2002 | Barnes | .......................... | 343/787 |
| 6,621,462 B2 * | 9/2003 | Barnes | .......................... | 343/787 |
| 6,768,466 B1 * | 7/2004 | Andrieu et al. | ................ | 343/707 |
| 6,771,226 B1 * | 8/2004 | Dujmovic | ..................... | 343/797 |
| 7,292,197 B2 * | 11/2007 | Goldberg et al. | .......... | 343/792.5 |
| 7,545,338 B2 * | 6/2009 | McLean | ..................... | 343/792.5 |
| 7,583,233 B2 * | 9/2009 | Goldberg et al. | .......... | 343/792.5 |
| 8,264,410 B1 * | 9/2012 | Wang | ..................... | 343/700 MS |
| 2002/0154064 A1 * | 10/2002 | Barnes | .......................... | 343/770 |
| 2005/0084031 A1 * | 4/2005 | Rosen et al. | ................... | 375/295 |
| 2005/0100102 A1 * | 5/2005 | Gazdzinski et al. | .......... | 375/242 |
| 2007/0103376 A1 * | 5/2007 | Goldberg et al. | .......... | 343/792.5 |
| 2007/0252777 A1 * | 11/2007 | Hsu et al. | ....................... | 343/895 |
| 2007/0285331 A1 * | 12/2007 | Sarabandi et al. | ............. | 343/866 |
| 2007/0285332 A1 * | 12/2007 | Sarabandi et al. | ............. | 343/866 |
| 2008/0117115 A1 * | 5/2008 | McLean | ..................... | 343/792.5 |
| 2009/0102705 A1 * | 4/2009 | Obermeyer | .................. | 342/25 F |
| 2012/0249374 A1 * | 10/2012 | Wang | ..................... | 343/700 MS |

* cited by examiner

Primary Examiner — John B Sotomayor

(57) ABSTRACT

This invention relates to improved ultra-wideband synthetic aperture radar and inverse synthetic aperture radar, capable of simultaneously and independently imaging a plurality of spectral and polarimetric channels covering multiple radio frequency octaves. Advances in technologies relating to signal processing, graphical user interfaces, color representations of multi-spectral radar images, low aerodynamic drag polarimetric SAR antenna systems, and synthetic aperture radar aircraft platforms are some of the advancements disclosed herein.

24 Claims, 30 Drawing Sheets

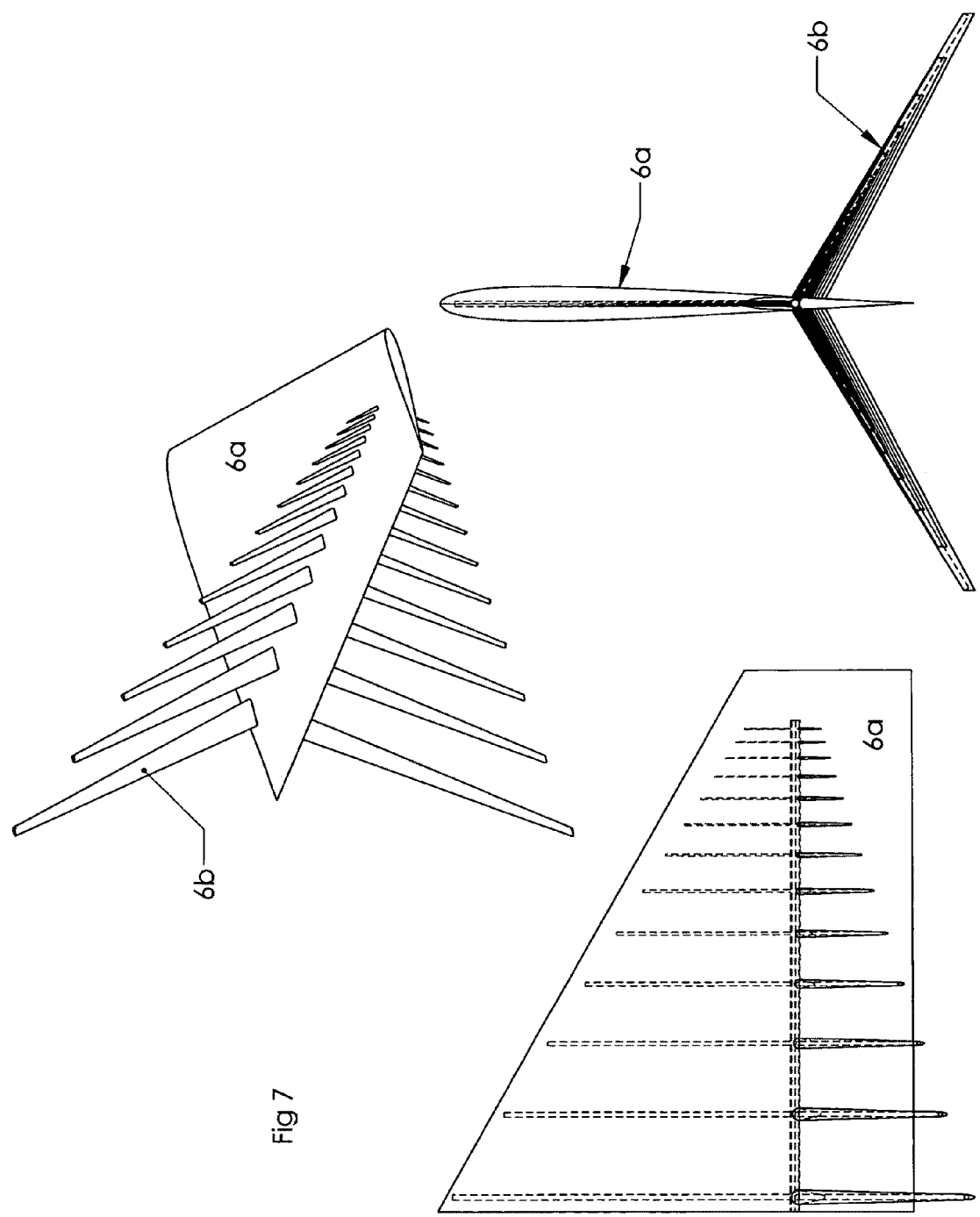

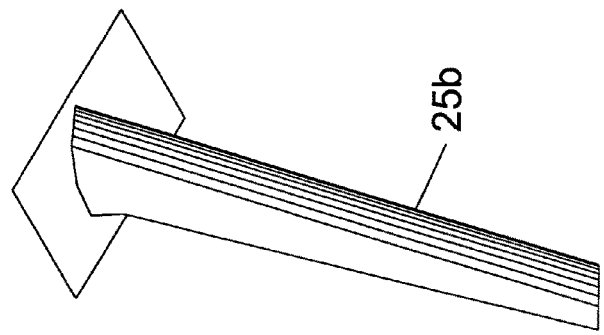
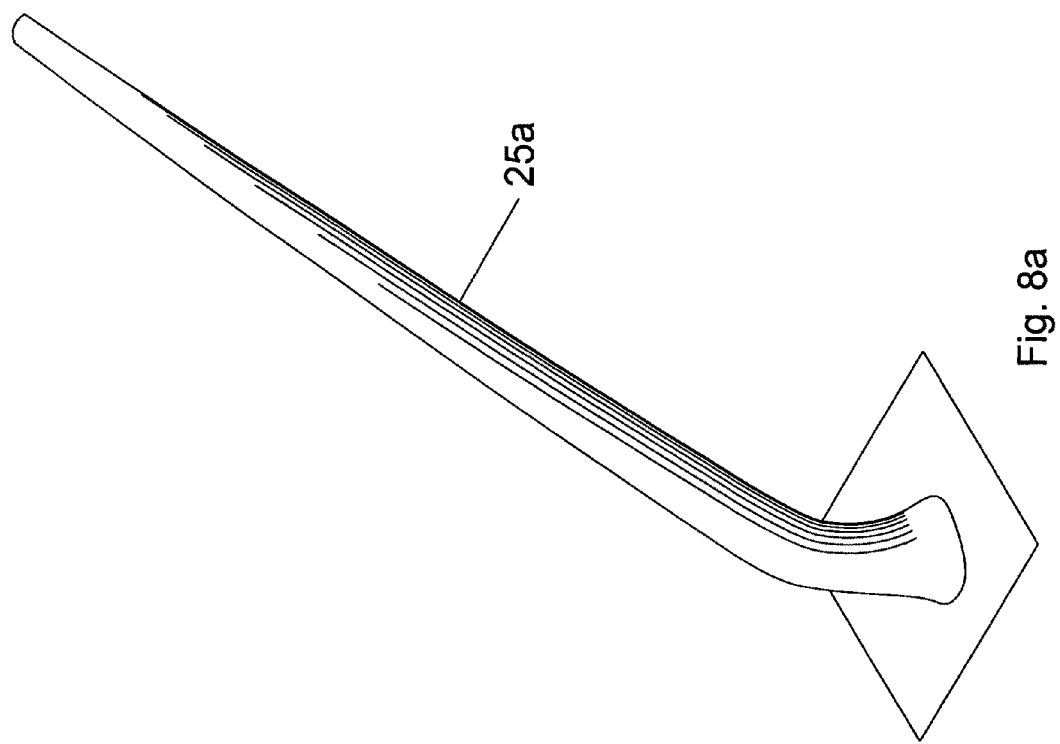

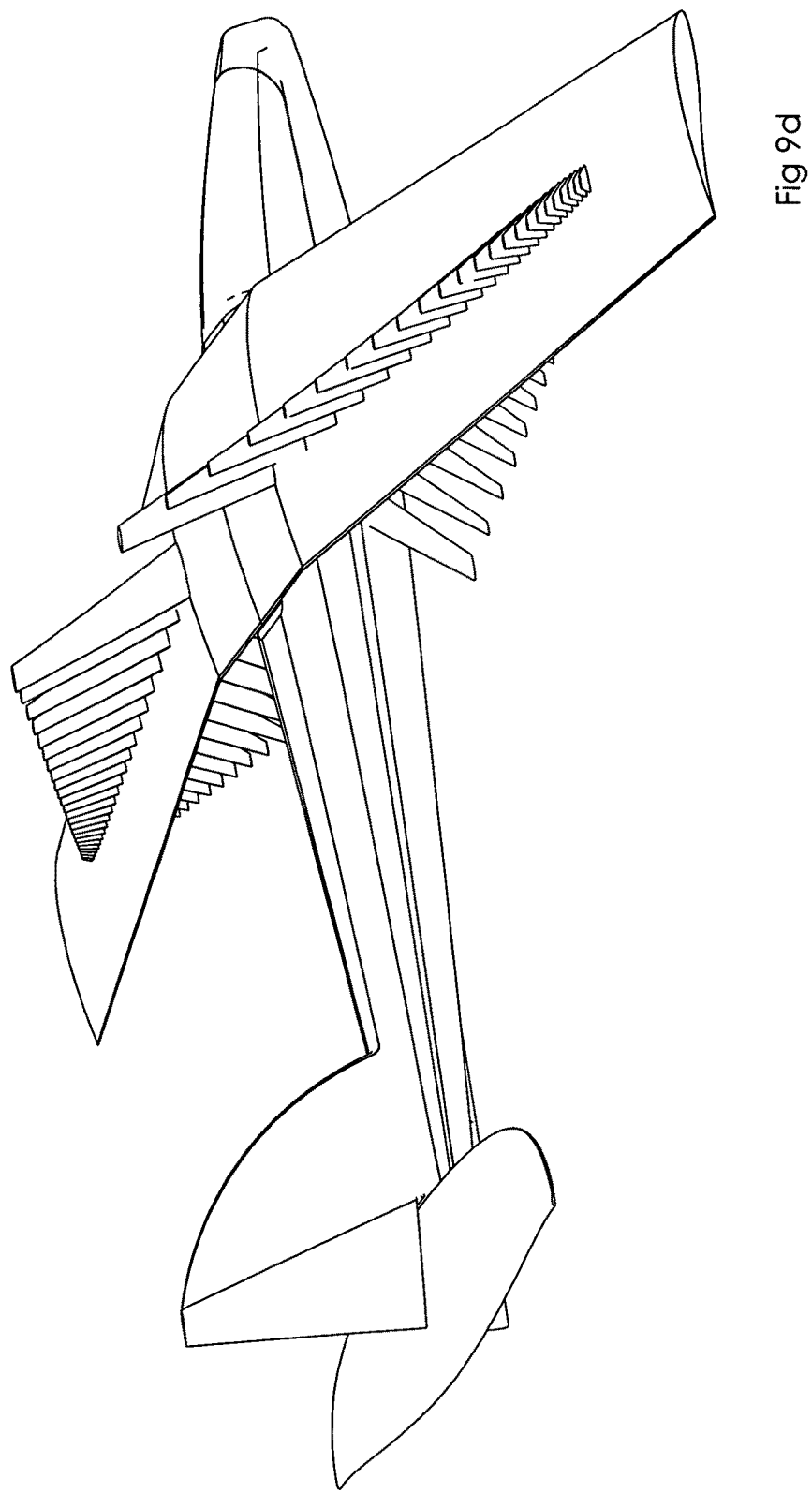

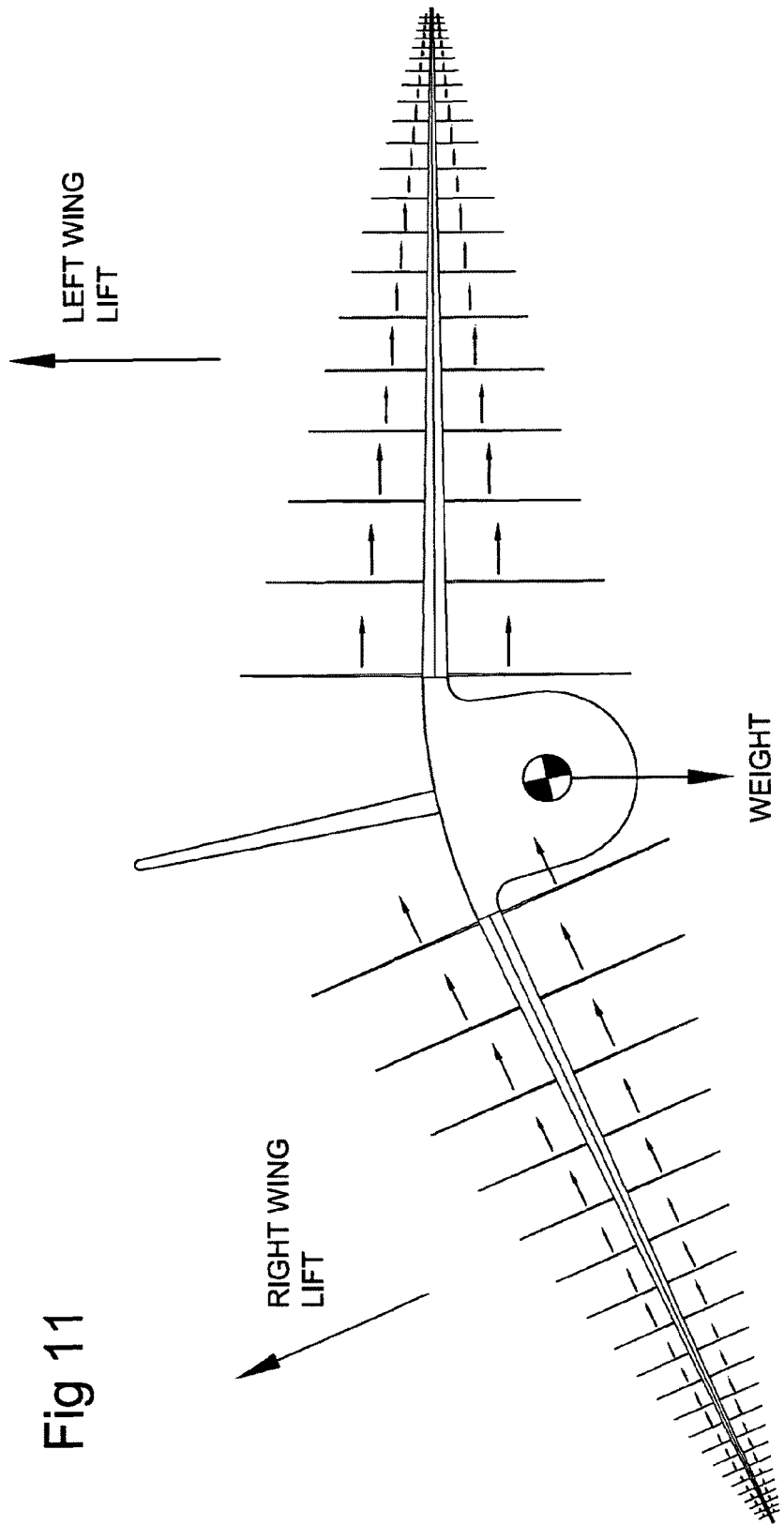

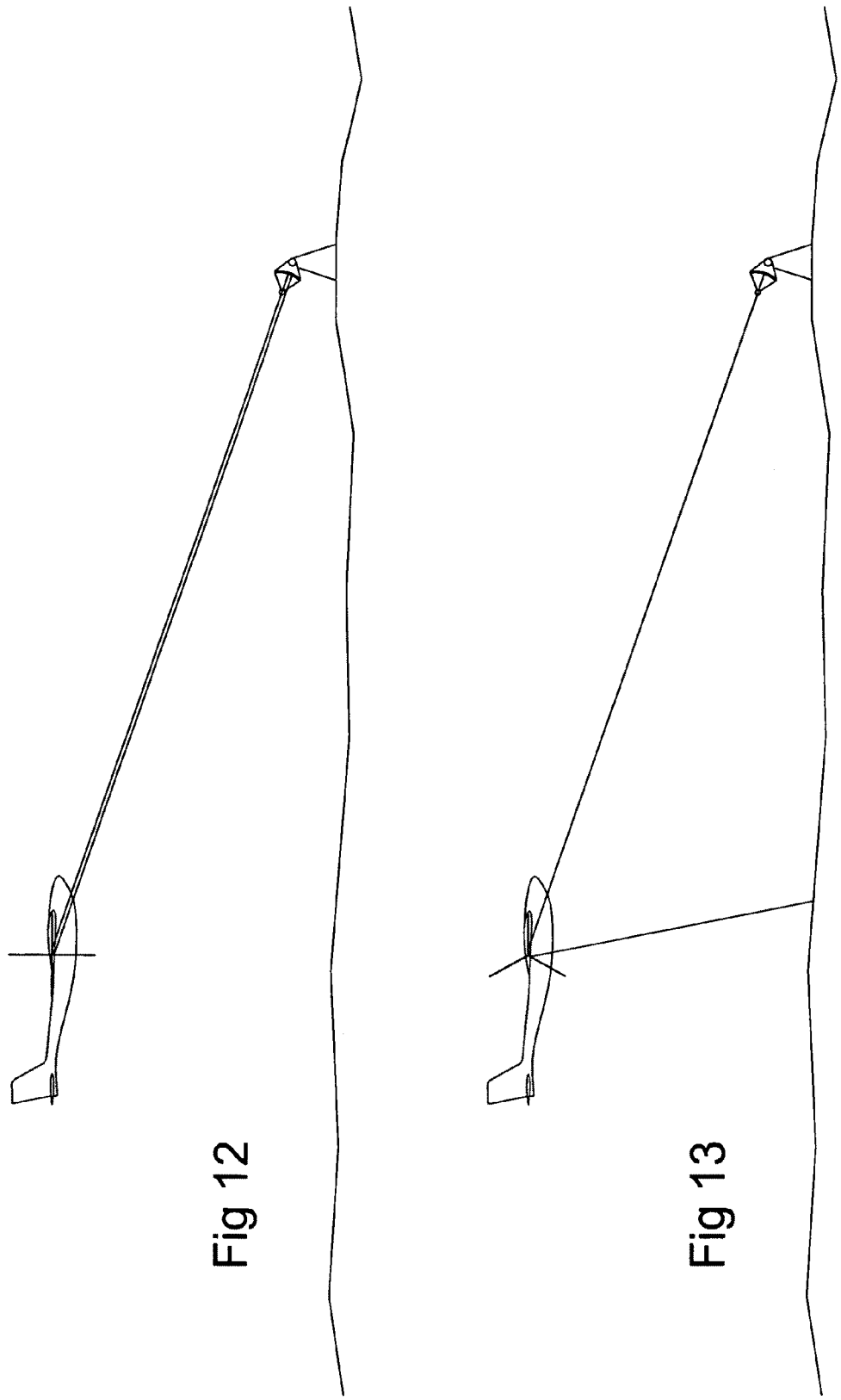

Fig. 17
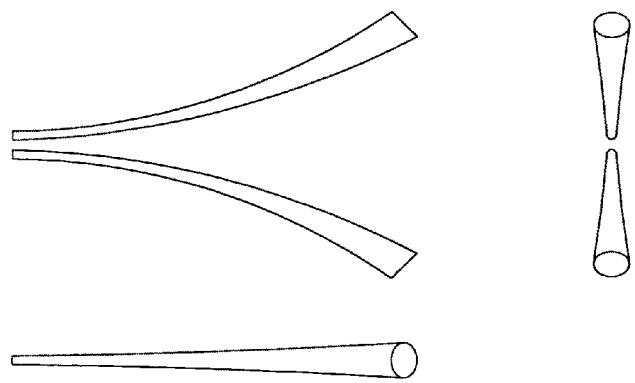
Fig. 18
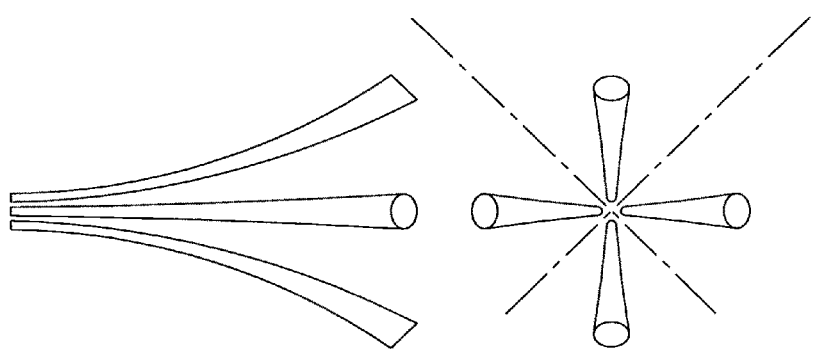
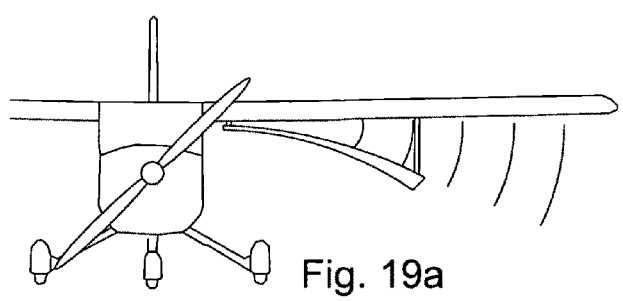
Fig. 19a
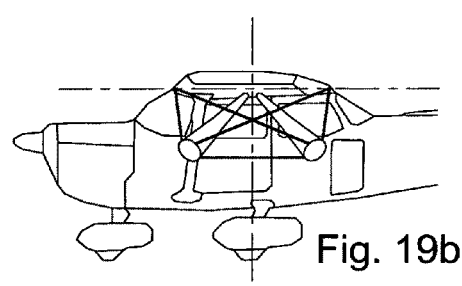
Fig. 19b

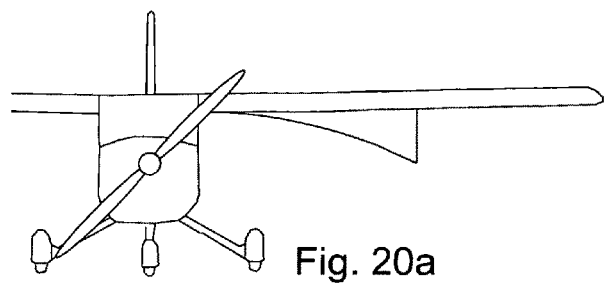
Fig. 20a
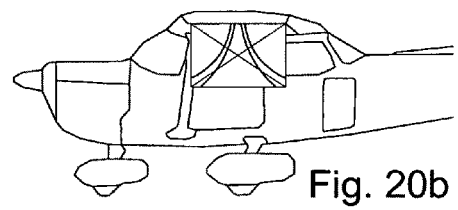
Fig. 20b
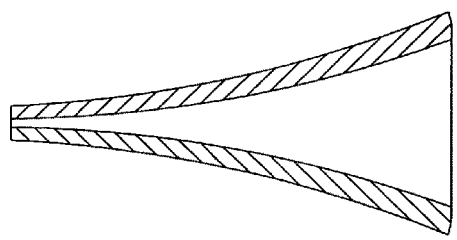 
Fig. 21
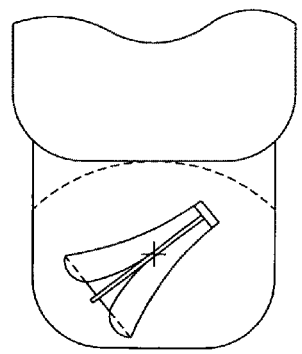
Fig. 22

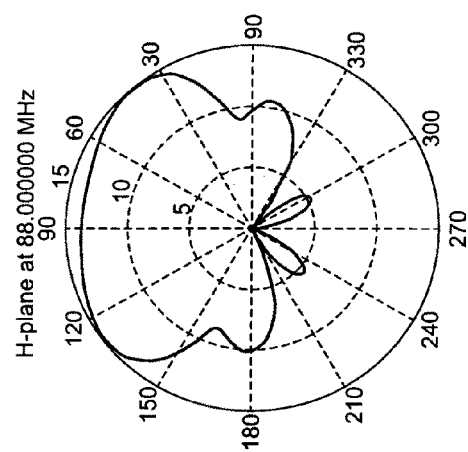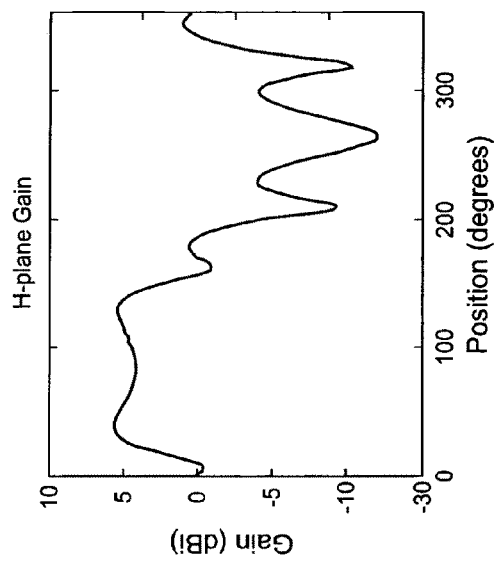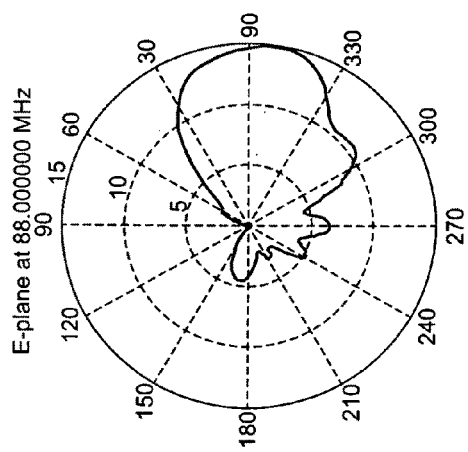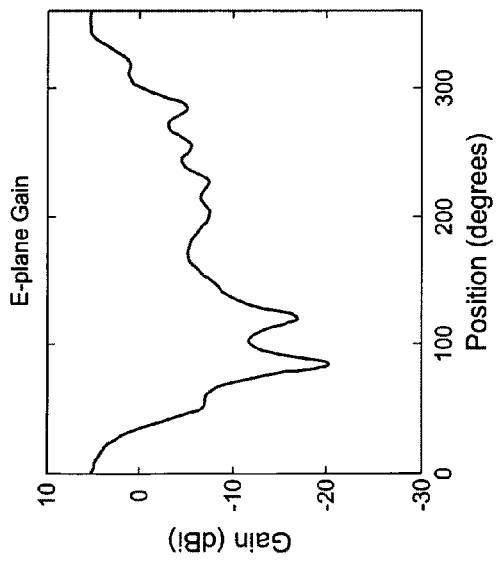
Fig. 24c

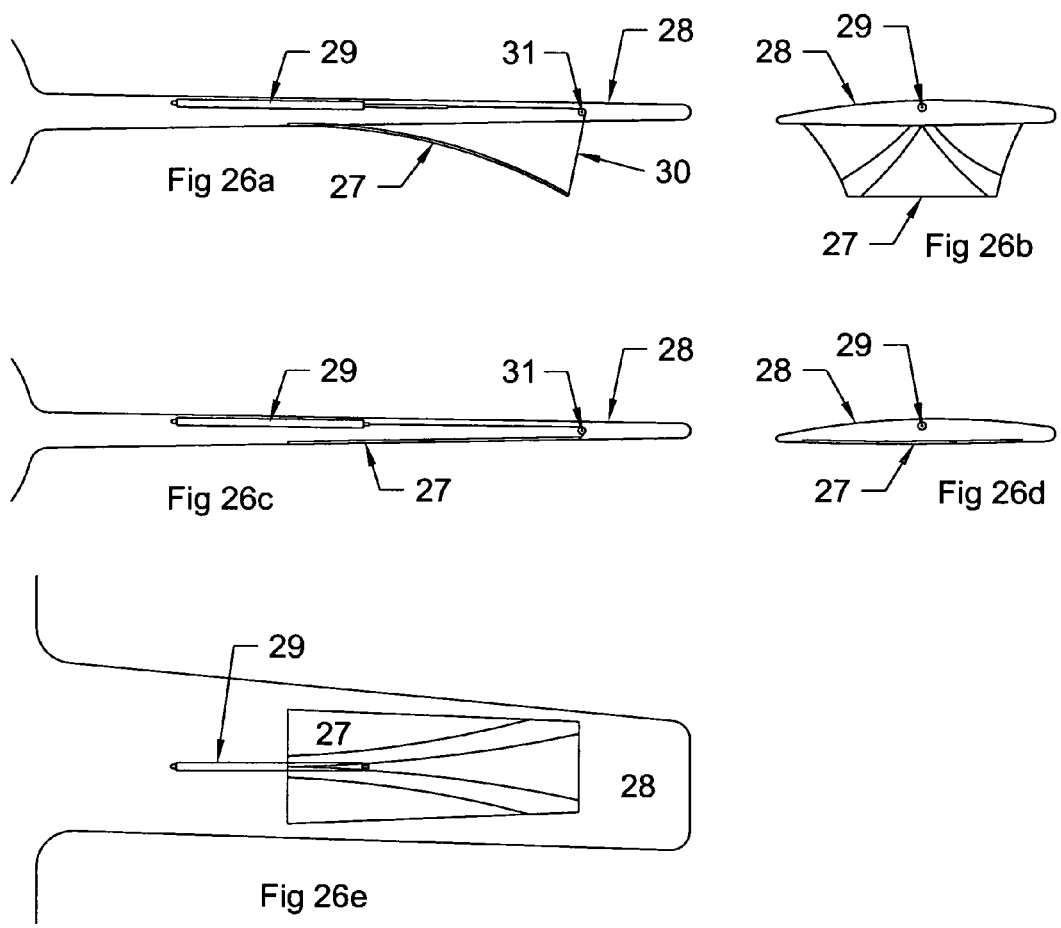

SPECTROMETRIC SYNTHETIC APERTURE RADAR

This application claims the benefit of U.S. Provisional Application No. 60/874,397 filed Nov. 30, 2006 which is hereby incorporated by reference. United States Provisional Application entitled "Airborne Ultra-wideband Synthetic Aperture Radar" filed Nov. 30, 2007 is also hereby incorporated by reference.

BACKGROUND OF THE INVENTION

1. Field of Invention

The present invention relates to improved ultra-wideband synthetic aperture radar and aircraft antennas therefore. The exploitation of the radio frequency spectral content including, for example, VHF/UHF bandwidths of a decade or more, of synthetic aperture generated images using airborne platforms of limited size, is disclosed. Antenna polarization agility may be provided by a log periodic tripole array that provides low aerodynamic drag, robust aerodynamic stability, and uniform gain over its bandwidth without the need for a radome.

2. Description of Related Art

Airborne synthetic aperture radar has historically been implemented over frequencies ranging from perhaps 10 MHz to around 100 GHz with bandwidths from a few MHz to several hundred MHz. Ultra-wideband synthetic aperture radar has generally been defined as radar with a bandwidth of at least +−25% of center frequency. An example would be a system operating from 200 to 400 MHz. Ground penetrating and foliage penetrating SAR generally performs best at the lowest frequency that will provide adequate spatial resolution, resulting in systems generally falling in the VHF and UHF bands. For detection of small shallow buried mines, somewhat higher frequencies of up to several GHz (corresponding to the resonant scattering of the emplaced mines) have been successfully used.

Foliage penetration synthetic aperture radar (FOPEN radar) has been implemented in the form of the CARABAS 1 system using a pair of horizontal inflatable antenna elements extending to the rear of the aircraft, and as CARABAS II using forward extending horizontal elements. The CARABAS III system is reported by Jane's to operate in the 20 MHz to 90 MHz band. Alternatively, log periodic monopole arrays extending horizontally aft of the wing trailing edge may be used, however, such arrangements may require elaborate mounting systems in order to accommodate flap and aileron articulation and are restricted to horizontal polarization. Under-wing log periodic dipole arrays have been used, utilizing the bottom of the wing as a reflective ground plane. This results in dipole length being limited by wing chord dimensions and is also limited to horizontal polarization. The exclusive use of horizontal polarization may result in non-detection of generally vertically oriented targets, such as standing or walking people. Ground penetration is also severely limited when using exclusively horizontal polarization.

U.S. Pat. No. 4,866,446 and U.S. Pat. No. 4,965,582, both to Hellsten and both describing several variations of the aforementioned CARABAS systems, disclose synthetic aperture radar systems that only utilize horizontally polarized rf signals. Vertically oriented targets may not be detected due to very limited response to horizontally polarized rf signals. Rf ground penetration needed to detect subsurface targets is inferior in the case of horizontal polarization, a phenomenon familiar to anyone who has used polarized sunglasses to see into a pool of water by suppressing the horizontally polarized light reflected from the surface of the water. A further disadvantage of using only horizontal polarization is that automatic target detection (ATD) is not nearly as effective with single polarization as it is with the three polarization channels (H-H, V-V, V-H). The two additional image layers provided by a fully polarimetric SAR and missing from a single polarization SAR importantly help to discriminate targets from clutter and thereby provide a lower false alarm rate and a lower target detection threshold. The functionality of the prior art systems described in U.S. Pat. No. 4,866,446 and U.S. Pat. No. 4,965,582 is further hindered by the use of a common resolution cell size (in azimuth and in range) over the entire system bandwidth, which limits the resolution needed for detection of small targets which respond to higher frequencies but have a smaller radar cross section than similar but larger targets. Additionally, range resolution is generally proportional to bandwidth and, although Hellsten discloses systems utilizing widely separated frequency bands, the bandwidth of the individual frequency bands is limited and therefore is also the range resolution of targets responding to those frequencies.

Vertical log periodic monopole arrays have been implemented using tensioned cable elements suspended between the vertical and horizontal stabilizers of an aircraft however; the suspended cable antenna elements are subject to uncontrolled deflections and resulting phase errors, while overall antenna dimensions and orientation is restricted by the aircraft configuration.

Conventional SAR systems generally utilize range compression of the scattered and received return from each chirp (or equivalent) to obtain a temporal (fast time) sequence of the collective contributions of the impulse responses of the various scatterers in the radar scene. With reference to the phase position (in time and space) of each transmitted chirp (or equivalent), the magnitude and phase history of the received and range compressed signal is used to generate a single image for each polarization such as H-H, V-V, and V-H. Any information regarding spectral content contributing to each resolution cell is lost in this process with the exception of delayed returns from resonant targets which may in some cases reveal spectral content in the form of periodic range spreading of the images of resonant targets.

Radar transmitters with instantaneous bandwidths of perhaps 20 MHz to 1000 GHZ may presently be configured from commercial off-the-shelf (COTS) digitally controlled arbitrary waveform generators in conjunction with ultra-wideband power amplifiers. Alternatively, COTS ultra wideband pulse generators may be used (with or without amplifiers) as transmitters. Ultra-wideband radar receivers may similarly be configured using COTS low noise amplifiers in conjunction with COTS high speed analog-to-digital conversion devices and high speed digital processors. Furthermore, the small size, low weight, and low power consumption of currently available high speed processors would make it possible, with sufficient system bandwidth, to simultaneously form images from multiple spectral and polarimetric channels. The result of these developments is that available ultra-wideband synthetic aperture radar performance is becoming limited by available antennas. Furthermore, the images that would result from coherently combining the contributions from signals at extremely diverse wavelengths cannot preserve variation in target phase center as, a function of frequency, cannot take advantage of the superior azimuth resolution otherwise available from the small antenna aperture that should be used for the shorter wavelengths and, except for the forementioned spatially filterable resonance artifacts, neither preserves nor reveals any of the spectral content of the scene.

This is especially true when the antenna selection is narrowed down to those that may be fitted to unmanned Aerial vehicles (UAVs), which are generally smaller than conventional manned aircraft. Conventional dual polarized antennas with acceptable gain at VHF frequencies are undesirably large and may not be able to be carried on small unmanned aerial vehicles (UAVs). Great progress has been made in the field of phased array antennas capable of electronic beam steering. Progress has likewise been made in the filed of conformal (conforming to the aircraft surface) antennas. These developments are well suited for covering one to perhaps a few relatively narrow frequency bands from any single antenna. These recent developments do not readily and economically provide frequency coverage, for example, from 50 MHz to 1000 MHz, with uniform and sufficient gain for synthetic aperture radar use over this entire bandwidth with an acceptable VSWR on a small aircraft. The use of large arrays of active antenna elements may result in an expensive system with high electrical power consumption.

Conventional log periodic dipole arrays (LPDAs) are effective over bandwidths of up to several decades and are commonly configured for dual (horizontal and vertical) polarization. Conventional dual polarized LPDAs utilize vertical elements that tend to be aerodynamically unstable and exhibit high aerodynamic drag. The forward facing elements would also be subject to aerodynamic instability. A radome may be used to insure aerodynamic stability; however this may only exacerbate the drag problem, especially in the VHF band. Conventional aircraft antennas are commonly configured as a swept blade element in order to achieve aerodynamic stability in conjunction with low drag. Conventional LPDAs cannot be built up of such swept blade elements because half of the elements would be unstable because they would point in the wrong direction (into the wind).

Spectrometric data has been derived from systems using real aperture antennas, but without the much higher spatial resolution provided in accordance with this invention. Inverse SAR (ISAR) has been used to image rotating targets without relying on radar platform movement to generate an aperture. It appears that, as in the case of SAR systems, no ISAR systems have been developed with spectral discrimination capability. Such capability could be extremely valuable for aircraft identification. Infamously, civilian airliners with hundreds of passengers have been shot down for failure to be identified as civilian airliners. Spectrally discriminate ISAR might readily pick up on characteristic resonant features such as fuselage window openings and aid in aircraft identification.

SUMMARY OF INVENTION

It is an object of this invention to provide a synthetic aperture radar with decade-plus bandwidth over the VHF and UHF bands that have been proven effective for foliage penetration and ground penetration in a form factor that is compatible with single engine manned aircraft or equivalently sized UAVs. The decade-plus bandwidth serves several objectives. Firstly, it provides fine range resolution. Secondly, it may be selected to bracket the entire impulse response spectrum of selected targets of interest enabling spectral, as well as polarimetric, target identification. These two objectives may, for some applications, be served simultaneously by creating a high resolution radio frequency panchromatic scene onto which may be mapped at slightly lesser resolution spectral target response.

Resonant targets have a persistent (decaying sinusoidal, for example) impulse response that includes late returning radio frequency energy. Such late returning radio frequency may manifest itself as undulating image artifacts extending downrange from true target position. Image sharpening may be approached by several alternative means. Deconvolution of the range compressed signal with the impulse response of any one target of interest may be used to correct the range spreading effect for that particular target. If the range compressed signal is processed through a filter bank, deconvolution may be performed using a unique frequency dependant impulse responses for each frequency bin. Filtering of the partially processed return signal according to frequency allows separate portions of the signal to be convolved with carefully selected and distinct (as to both scale and form) impulse responses representative of those targets within each particular frequency range that are of interest. Targets mismatching the impulse response used to convolve each signal portion will conversely and usefully be defocused (in range) or attenuated. Targets matching the impulse response filter will create a sharp response approaching a Dirichlet step function. The thus far processed video signal may be then subjected to a high pass filter in order to remove or attenuate the signals from mismatching targets. This filtering process may be applied to each of a number of impulse responses of interest, the results of each filter scheme being directed to separate complex (spectral) channels for storage or image processing. Images corresponding to each channel thus collected may be formed by back-projection, for example, and displayed accordingly. For example, each of several spectral channels may be assigned unique display colors. Alternatively, the color of the display may be varied cyclically or under operator control with the radio frequency spectral content of the scene mapped to human perceived colors (generally red, green, and blue).

In some cases, wherein the phase center of the target varies as a function of wavelength, it may be advantageous to separate the phase histories at disparate wavelengths and to generate distinct images for each of several ranges of wavelength. Complex vectors representing disparate wavelengths may be added, but such addition will only enhance an image if the vectors have similar phase angles. Phase correction as a function of wavelength may be required prior to addition of the complex vectors. Effective target location as discerned at various resonant frequencies will vary according to target-signal interactions including excitation of various target resonant modes. Polarization of the return signal will also vary in accordance with the above. Target matched filters may be configured to account for orientation specific impulse responses of the targets of interest. Likewise, the exploitation of harmonic scattering from non-linear targets may require that the spectral content of the scattered signal due to non-linear target behavior be isolated from the balance of the target spectral content in order to adequately preserve the target spectral signature. Coherent addition of signals over all wavelengths would likely obscure the presence of weaker harmonically scattered signals from non-linear targets, even though such harmonic scattering may be coherent with target returns at the exciting frequency.

Range resolution is proportional to both bandwidth and waveform (frequency and phase) resolution. Waveform resolution may be maximized in accordance with available analog to digital conversion equipment. At the time of this writing, 60 Gs/sec (60 billion samples per second) equipment is available as commercial off-the-shelf (COTS) equipment. This recently available analog-to-digital conversion bandwidth eliminates, for VHF and UHF bands, the need to perform baseband conversion of the returned radar signal in order to remove the carrier frequency. Elimination of baseband conversion also conserves signal integrity and ultimate resolution of the returned temporal signal waveform and frequency. By utilizing an extremely wide bandwidth, and by maximizing temporal resolution of reflected radar data, sufficient information may be derived from the signal to simultaneously support both adequate range resolution and useful spectral resolution. Wavelet decomposition of the phase history signals may be used to obtain a desirable and extremely useful balance between spectral resolution and range resolution. For example, a 3 octave bandwidth such as 50 to 400 MHz might be decomposed into three spectral channels including 50 to 100 MHz, 100 to 200 MHz, and 200 to 400 MHz. In this manner, small targets with greater scattering in the 200 to 400 MHz band would be resolved in range with finer resolution (taking advantage of a 200 MHz bandwidth) than larger targets with greater scattering in the 50 to 100 MHz band (for which range resolution would derive from a 50 MHz bandwidth). With respect to azimuth resolution, the frequency dependant aperture of the log periodic tripole array herein disclosed provides an antenna aperture proportional to wavelength and thus may be used to provide finer azimuth resolution for smaller targets which generally scatter at shorter wavelengths, in conjunction with acceptably courser resolution for larger targets which generally scatter at longer wavelengths. Synthetic aperture radar images formed (by back projection, for example) from each of 3 complex binary (varying by a factor of two in scale factor) wavelet decomposition phase history channels might, for example, be coded to human perceivable red, green, and blue colors and overlaid in order to provide a human perceivable full color radar image. As an example, multiple distinct image layers image layers may be formed that include information derived from V-V, V-H, and H-H polarizations, each in conjunction with a plurality of spectral channels. This is desirable and useful because many targets of interest have unique signatures which may include wavelength-dependant scattering along distinct, e.g., orthogonal axes. As a simple example, a typical artillery round has a longer wavelength resonance along its major axis in conjunction with a shorter wavelength resonance normal to its major axis, resulting in a unique polarimetric/spectral signature. Polarimetric/spectral signatures may be used for automatic target detection (ATD). This approach may be particularly useful for identifying targets which are too small, relative to the spatial resolution of the radar, to be identified by shape alone, or even polarimetric signature alone. Conventional utilization of all available waveform data to exclusively support range resolution results in loss of spectral discrimination of targets. Furthermore, the effective phase center of a target in its role as a reflector may be wavelength dependant. Accordingly, coherent addition, without phase correction, of complex signals from disparate wavelengths may result in undesirable loss of target information. Prior knowledge of target impulse response may be used advantageously in this regard. Recently available image processing hardware which may be used for back projection, for example, is sufficiently small, lightweight, and computationally fast that it has become feasible to simultaneously utilize multiple back projection processors to process each of a variety of spectral and/or target match filtered channels, each with multiple polarization channels such as VV, HH, VH, and HV in real time or near real time on board the platform aircraft.

In accordance with a further embodiment of this invention, moving targets, especially moving targets on the ground, may be detected by combined polarimetric and spectral change detection between images collected from temporally closely spaced collects along approximately the same flight path. In contrast to relying on coherent change detection, as would be required in the case of a system of single polarization, and which would require very precise flight path coordination, the proposed system is able to utilize combined polarimetric and spectral change detection in order to detect change in position of targets moving too slowly to result in detectable Doppler shift at the low frequencies required for good foliage penetration, while not requiring a difficult to achieve level of flight path precision. In strip map mode, such collects might be most efficiently performed by two or more SAR platforms, e.g. aircraft, spaced at intervals selected to minimize radio frequency interference between the SAR systems on each of the aircraft, while allowing target movement sufficient to resolve while limiting target movement sufficiently to correlate targets between collects. In one embodiment, one platform might be towed by another, with the tow connection also supporting data and/or electrical power transfer between platforms. Combined polarimetric and spectral change detection provides robust change detection with a low false alarm rate as well as high change detection reliability. Radar receivers within coordinated SAR systems such as described above may of course be configured and operated to receive signals originating from transmitters on other platforms within a coordinated multistatic radar system. Such signals may include those reflected off of the scene being collected as well as reference signals transmitted between SAR platforms.

In accordance with a further embodiment of this invention, combined polarimetric and spectral change detection may be applied to sub-aperture images in order to detect, during a single collect from an individual platform, movement of targets too slow for Doppler detection. Alternatively, moving targets may be identified, refocused and imaged in either 2 or 3 dimensions, separately from the stationary portions of a scene, the phase history of such movement being analogous to visual hologram recordings of moving objects within stationary scenes.

In the field of electrical power engineering, 3 phase electrical power supplanted two phase electrical power in the early $20^{th}$ Century. Current antenna practice stands in sharp contrast to electrical power system practice. Orthogonal, e.g. vertical and horizontal, polarizations are generally handled, in accordance with current art, with 2 distinct circuits and 2 distinct sets of antenna elements and are in many respects analogous to $19^{th}$ Century 2 phase electrical power systems. The fact that many of the efficiencies of three phase electrical distribution systems could be exploited for radio frequency transmission purposes, and specifically for synthetic aperture radar, appears to have been overlooked with the exception of perhaps a single published paper "*Electric Tripole Antenna For Circular Polarization*" *Antennas and Propagation*, IEEE, Vol: 22, Issue 5, September 1974 pp. 647-650 on the subject of using a tripole antenna with as 3 phase feed to generate a circularly polarized signal. The use of three phase antenna elements appears to be otherwise limited to the manufacture of frequency selective surfaces. The term "tripole antenna" has also been used to describe 3 mutually perpendicular antenna elements configured for the purpose of generation and detection of free space rf signals along three orthogonal axes with various polarizations as referenced in the list of patents attached hereto. Circularly polarized broad band transmissions have heretofore been typically generated by the use of spiral or other asymmetric antennas (driven by a common circuit) or by means of coordinated 2 phase feeds to dual polarization antennas such as crossed log periodic arrays or quad ridged horns.

Many microwave synthetic aperture radar systems utilize phased array antennas with independently controllable elements in order to provide steerable and high gain (narrow) beams. Such phased arrays have typically provided limited bandwidth. Arrays of wideband antennas such as horns or dipole arrays (arrays of log periodic arrays) may be used; however, azimuth resolution at high frequencies may be compromised by the unnecessarily large aperture at high frequencies. Independent control of array elements generally consumes more power than required for physically aimed phased arrays due to the power consumption of phase shifting circuits and especially phase attenuation devices. Log periodic dipole arrays (LPDAs) and log periodic monopole arrays are examples of a passive (physically rather than electrically steered) arrays that may be used to obtain acceptable gain (4 TO 10+ db), wide bandwidth (a factor of twenty or better), excellent electrical efficiency and no power consumption by active devices. For strip map synthetic aperture data collection, the tripole log periodic array disclosed herein may be optimally oriented (over a range of specified depression angles in elevation and in azimuth at approximately right angles to the aircraft flight path) without the requirement for electronic steering or the electrical power consumption of components such as phase shifters and attenuators typically used to electronically steer an antenna beam pattern. Reduced electrical power consumption results in longer mission capability and the possibility of using smaller platform. In a preferred embodiment, the 120 degree and 240 degree antenna elements provide supplemental aerodynamic area normal to the wings just to the rear of the aircraft center of gravity. This supplemental aerodynamic area may used to support gravity loads along the axis of the wing during sustained straight line flight at non-zero bank angles, and also provides aerodynamic surface area with positive dihedral angle, thereby compensating for the reverse dihedral (anhedral) angle of the wings and thereby recouping at least some of the aircraft roll stability compromised by the reverse wing dihedral angle. Alternatively, the log periodic tripole array in accordance with this invention may be incorporated into an aircraft empennage. As an example, the LPTA as herein disclosed may be substituted for the outer portions of each of the downward sloping stabilizers incorporated on some versions of the Predator UAV. It should be noted that lower frequencies require larger elements and higher gain requires a greater number of elements and a longer antenna span. Thus, the LPTA herein disclosed will generally provide higher gain and longer wavelengths if incorporated into wings as opposed to being incorporated into empennage elements. For the largest wavelength to wingspan ratio, it would be possible to use a single LPTA with airfoil as an asymmetric wing in conjunction with a non electrically interfering fuselage. For both left looking and right looking operation, the LPTA airfoil might be symmetric in cross section so as to provide equal and sufficient lift in both left looking and right looking modes of operation. It should be understood that the LPTA airfoil configuration need not constitute or replace a functional aircraft surface. Its advantageous low drag and structural stability are beneficial and advantageous compared to conventional antennas even if the LPTA airfoil is appended to a complete aircraft as an external payload. In one embodiment, the LPTA airfoil may be carried as a suspended load beneath a helicopter, for example, in conjunction with its own empennage and/or balance weights for directional control and stability.

It is an object of an aspect of a further embodiment of this invention to provide an antenna for which the horizontal elements are embedded into a functional aircraft surface such as a wing, canard, or horizontal stabilizer. The sweep angle, relative to the direction of flight, of the 120 degree and 240 degree elements in accordance with one aspect of this invention provides aerodynamic stability as well as gust resistance to the individual elements. As with a swept wing, any deflection of an antenna element over its length reduces its angle of attack relative to the flow causing such deflection, thus limiting resulting structural loads. In comparison with an aerodynamically optimized conventional "two-phase" (dual polarized) log periodic dipole array, the aerodynamic center (in the vertical plane of flight) of the non-horizontal elements is shifted aft of the aircraft center of gravity, thus augmenting yaw stability of the aircraft and potentially eliminating otherwise required vertical stabilizer area. Elimination of otherwise required vertical stabilizer area reduces the incremental drag associated with providing antenna function to the host aircraft. The vertical area provided by such an antenna may also be beneficially used to facilitate steady state straight line flight at an aircraft at a bank angle that results in a desired antenna beam depression angle for strip map SAR data collection. The same vertical area provides additional bank angle (and thus depression angle) control, independent of aircraft speed and turning radius, while turning for the purpose of spotlight mode SAR or circle SAR data collection. In accordance with a further aspect of one embodiment of this invention, a reverse dihedral wing angle of perhaps 10 degrees may be used to provide a suitable antenna beam depression angle while navigating a straight and level flight path for strip map mode SAR data collection. Such a reverse dihedral angle is preferably implemented in conjunction with a high wing (wing attached near the top of the fuselage) aircraft configuration in order to maintain adequate roll stability of the aircraft. It should be noted that the positive dihedral angle provided by the 120 degree and 240 degree antenna elements acts toward offsetting the reverse dihedral angle of the wings and thus contributes to roll stability of the aircraft. Other non-radio frequency functional aerodynamic surfaces, such as the empennage, may be likewise configured with positive dihedral angle in order to further compensate for the reverse dihedral angle of the wings and to maximize overall aircraft roll stability.

It is a further object of this invention to provide a log periodic array antenna with a reduced frontal radar cross section. The vertical elements of a conventional dual polarized log periodic array, if they were flown as an airborne side looking SAR antenna, would present a very large frontal radar cross section due to the vertical elements. Furthermore, the 90 degree angle between vertical and horizontal elements would act as a retro-reflector along one axis, resulting in a very large radar cross section, making such a configuration particularly observable from fore or aft by airspace surveillance radars.

For spotlight mode synthetic aperture radar data collection, the collecting aircraft may be fully or partially circled around the area of interest without the need for electronic beam steering. Detection of a normal refection (glint) off of linear targets such as generally horizontal wires, a circular collect of at least 180 degrees may be sufficient. The optimum antenna beam depression angle depends on the targets to be imaged. For detection of vehicles, reflection off of generally vertical vehicle sides in conjunction with reflection off of generally horizontal ground or road surfaces provides an effective retro-reflector effect. In this case, a shallow depression angle may be used to assure reflection off of the surface of the ground. For detection of buried targets, reflection off of the surface of the ground is undesirable and a steeper depression angle is called for. Aircraft roll orientation relative to the horizon may be controlled by a combination of rate of turn, aircraft velocity, and rudder/aileron coordination. Again, as in strip map mode, the supplemental aerodynamic area of the antenna elements normal to the wing surfaces provide the capability and opportunity to adjust antenna beam depression angle somewhat independently of turning radius and aircraft velocity.

Ordinary single polarization LPDAs may be mounted coaxially with elements at 90 degrees to create dual polarized LPDAs. The resulting structure has elements oriented in each of 4 orientations spaced 90 degrees apart. Conformal arrays of small ultra-wideband antennas have been proposed. The use of such arrays for synthetic aperture radar may result in less than optimum azimuth resolution at high frequencies if the same (array) aperture size is used across the operating frequency range. Azimuth resolution is a function of wavelength and antenna aperture size. Small antenna apertures resulting from individual short wavelength antennae or compact arrays of short wavelength antennae provide superior azimuth resolution compared to large antenna apertures resulting form arrays of large long wavelength antennae. When used as elements of a larger phased array, the azimuth resolution will be compromised. In accordance with one aspect of this invention, the aforementioned reduction of shorter wavelength azimuth resolution may be minimized by attenuating the feeds to the outer antenna elements in order to reduce effective aperture at shorter wavelengths. Long wavelengths provide superior foliage and ground penetration. Ultra-wide bandwidth may be used to simultaneously provide high resolution of short wavelength reflecting targets, while also providing (without the cumbersome task of overlaying separate data sets) images of targets obscured by foliage, camouflage or earth. The log periodic tripole array disclosed herein may be used to synthesize vertically and horizontally polarized signals by vector addition of the signals applied to each of the three log periodic monopole arrays which comprise the log periodic tripole array. Circularly, elliptically, or otherwise polarized signals may be likewise synthesized. Log periodic arrays including the embodiment herein disclosed may be designed to provide approximately constant gain and frequency dependant aperture over the entire ultra-wide design frequency range. The collection of high azimuth spatial resolution data may thus be accomplished at small apertures and high frequencies simultaneously with the collection of low frequency data from targets obscured by foliage, earth, or radio frequency permeable structures, albeit at lower azimuth spatial resolution. Processing of wide bandwidth signals at multiple frequency dependant temporal resolutions is generally referred to as "multi-resolution processing".

The log periodic tripole array (LPTA) antenna in accordance with this invention appears to be novel. Its function might be best expressed in comparison to the traditional log periodic dipole array (LPDA) antenna. The single polarization LPDA utilizes opposing (physically positioned at 180 degrees from each other) elements that are connected to each of two antenna feed conductors at a phase spacing of 180 degrees. The three phase log periodic array, in accordance with this invention, utilizes 3 rows of elements physically positioned at 120 degrees from each other. The antenna feed circuits may be arranged in any of several different connection schemes. An example feed arrangement utilizes one conductor for each pole orientation, such that the elements in any one orientation are connected as if they comprised a log periodic monopole array with each of the three rows of elements sharing a common ground terminal. Alternatively, each antenna element may be connected to one of three common feed circuits by means of an impedance matching device such as a transformer in order to provide an optimum impedance match over the full range of operating frequencies. In the case of producing circularly polarized signals, the three antenna feed conductors would be energized with three phase power, with some of the benefits inherent to three phase power systems. Some of the advantages of the three phase arrangement, however, may apply to other signal polarization schemes, such as the alternate horizontal and vertical polarization of transmitted signals or polarimetric discrimination of received signals. The required rating of each of the three amplifiers is less than the required rating for each of two amplifiers which might be used for a conventional horizontal and vertical antenna channels system of equivalent output power. The total electrical power consumption may also be less in the case of the tripole antenna feed compared to a conventional 2 phase antenna feed due to the higher duty cycle or utilization factor of each amplifier.

The antenna feed conductors may be excited to synthesize any desired polarization orientation. Polarization may be configured to be uniform across the range of transmitted frequencies or polarization may be varied as a function of frequency. Signal synthesis including signal polarization may be accomplished with three sources such as three independent arbitrary function generator channels, for example. Alternatively, one source, such as an arbitrary function generator, may be used to alternately excite one leg or another of a two phase feed (corresponding to conventional V and H channels) to feed to a resistive voltage divider network wherefrom the excitation signals for each of the monopole groups within the LPTA may be generated. Alternatively, two sources might be used to generate the two phase feed as above. The output of the aforementioned phase synthesis schemes could then feed each of three power amplifiers channels, each in turn feeding one of three antenna channels.

It is a further object of this invention to provide dual polarized antennas particularly suited to aircraft use that may be used for a variety of purposes for which conventional antennas are used such as radio reconnaissance, signals intelligence, communications, jamming, as well as for synthetic aperture radar.

It is a further object of an aspect of this invention to provide superior system electrical efficiency. This is accomplished by the higher duty cycle and lower total power rating of the three power amplifiers that power the three phase antenna in comparison with two amplifiers used to power a conventional dual polarization (two phase) antenna. Maximum electrical efficiency is important for small unmanned aerial platforms (UAVs) and is critical for space based systems. In accordance with a further aspect of this invention, amplifiers capable of more than one high efficiency output level may be used in conjunction with the antenna system in accordance with this invention.

It is a further object of this invention to facilitate high bandwidth and high resolution analog to digital conversion of the received radar signal. The optional use of three sets of analog-to-digital conversion circuits in conjunction with the herein disclosed three phase antenna extends both the effective system bandwidth and the effective system resolution compared to an otherwise equivalent system utilizing only two analog-to-digital conversion circuits in conjunction, for example, with a conventional dual polarized antenna.

Some of the advantages of the three phase system are manifested in power amplification and transmission sub-systems in the form of more efficient power amplifier utilization, other advantages manifest themselves in receiver and data acquisition sub-systems in the form of superior analog to digital conversion bandwidth and superior signal resolution. Other advantages may be manifested in the antenna itself, in particular the three phase log periodic array described herein. Other embodiments of three phase antennas in accordance with this invention may be analogous to traditional dual polarization of antennas of conventional design. For example, a tri-ridged horn antenna and its associated three phase electrical signal in accordance with one aspect of this invention has an analogy in conventional quad ridged horn antennae fed by two single phase circuits or "two phase" circuit.

Similarly, a three phase log periodic array in accordance with one aspect of this invention is analogous to a conventional log periodic dipole array (LPDA) in its crossed dual polarization ("two phase") embodiment.

In accordance with further aspects of this invention many varieties of dual polarization antennae might be advantageously configured to benefit from the various advantages of tripole operation. In addition to ridged horns and log periodic arrays, bowtie antennas, slot antennas, dipole antennas, Yagi-Udi arrays, conventional antennas with reflectors, and others may be advantageously adapted to three phase operation in accordance with the teachings of this invention.

It is an object of one aspect of this invention to provide a structurally robust, but lightweight, ultra-wideband antenna with uniform and sufficient gain and frequency dependant aperture that also features acceptable aerodynamic drag and good aerodynamic stability.

It is a further object of one embodiment of this invention to provide a light weight spaceborne UWB polarization agile synthetic aperture radar sensor. Weight of the total orbiting platform may be minimized by higher electrical efficiency, due especially to the lower required total radio frequency power amplifier rating, reduced conductor sizes, and reduced antenna weight. This is especially true in conjunction with solid state power amplifiers which vary little in power consumption between zero and full load. It is an object of a further aspect of this invention to utilize coherent harmonic emissions of targets that include non-linear electrical junctions. Detection of such emissions is facilitated by several aspects of the ultra-wide bandwidth of the SAR system herein disclosed. Firstly, the antenna and receiver bandwidth is broad enough to detect frequencies which are the second and third harmonics of the transmitted frequencies. Secondly, the wide bandwidth of the system herein disclosed facilitates resonance within a wide range of targets and thus results in high levels of harmonic signal generation within those targets with a non-linear impulse response and thereby increases the signal to noise ratio (of the harmonic signal component) and thus the probability of target detection. In accordance with a further aspect of this invention, the principles outlined and systems described herein may be used for spectrally discriminate ISAR. This may be especially useful for the identification of potential threats and might be used for distinguishing passenger airliners from fighter aircraft or for distinguishing missile warheads from decoys.

Signal Processing

It is an object of this invention to image, over a broad frequency range, for each spatial resolution cell, and for each spectral channel, full polarimetric information, e.g., Stokes matrix, of the entire scattered signal and of any coherent harmonics from non-linear targets, falling either within or outside of the transmitted bandwidth.

Range compression may be performed conventionally using, for example, a digital matched filter or a surface acoustic wave (SAW) device. Signal processing may be by means of wavelet transformation, for example. The wavelet kernel may be selected or configured to match the known or estimated impulse response of targets to be imaged. Likewise, the kernel may be purposely mismatched to the impulse response of otherwise obscuring vegetation, for example. In this manner SAR video data may be collected that includes not only the conventional I and Q intensity channels sampled in fast (range) time and slow (azimuth) time at various polarizations, but also further discerns the I and Q separately, not only for various polarizations such as HH, VV, HV, and VH, but also at a plurality of frequencies. Images corresponding to each of the spectral channels may be processed by any of a variety of processing algorithms such as $\omega$-$\kappa$, back projection, etc. Conventional SAR autofocus algorithms may be applied independently to each of the various spectral channels for optimum imaging of various layers of spectrally differing targets such as tree canopy, camouflage, weapons, ground surface, weapons caches or underground bunkers. Fully 3 dimensional tomographic images may be generated for one or more spectral channels, spotlight or "circle SAR" collections being preferred for 3 dimensional image generation. Alternatively, each spectral image may be focused to a predetermined most-probable-threat-elevation, such as an elevation above ground level for troop carried weapons. Similarly, foliage may be intentionally defocused in order to maximize detection of threats or specific targets of interest. The resulting images of various wavelengths may be mapped to human perceivable colors for electronic display or color printing purposes. Alternatively, automatic spectral signature filters may be applied to the image sets in order to reveal targets of interest such as unexploded ordnance, roadside bombs, weapons, infantry, vehicles and the like. In one embodiment of the invention, a computer mouse or cursor may be used to select image pixels for which spectral and polarimetric signatures are to be displayed and threat match probabilities calculated and displayed. In a further embodiment of the invention, spectral and polarimetric channels may be scrolled through under operator control while viewing (preferably in color) the thus filtered scene. Various algorithms may be applied to the image data. Signal intensities at selected frequencies and polarizations may be compared by subtraction, division or cross-correlation, for example, in order to reveal targets of interest having particular spectral and polarimetric signatures.

In a further embodiment of this invention, data from radio frequency passive devices may be collected which have a sensor dependant impulse response. Discrimination of a plurality of spectral channels by the SAR system herein disclosed allows for multiple bits of impulse response data to be collected. A SAR system in accordance with this invention might be configured to discriminate between 5 spectral channels each separated by one octave, covering the frequency range of 25 MHz to 800 MHz, for example, and thus allowing data collection from radio-frequency-passive sensors with 5 bit output signals.

In accordance with a further aspect of this invention, maximum spatial resolution may be preserved while also exploiting spectral information by forming a high range resolution image utilizing the full system bandwidth while overlaying onto said high range resolution image lower resolution spectral information derived from images formed from (lower resolution) partial bandwidth spectrally discriminate images. The efficacy of mapping low resolution spectral data to high resolution panchromatic images is supported by the market acceptance of Microsoft's (formerly Vexcel's) ULTRACAM aerial camera equipment and images produced there from in accordance with U.S. Pat. No. 7,009,638 to Gruber et al. The ULTRACAM acquires a very high resolution panchromatic grey-scale image which may be colored using spectral information from lower resolution image sensors each associated with defined wavelengths such as red, green, blue, near infrared, and ultraviolet. The extension of this principle to the exploitation of the spectral information content of synthetic aperture radar data is disclosed herein.

In accordance with the present invention, spectrographic techniques may be used to identify resonant (or radio frequency non-monochromatic) targets such as weapons, ordnance, mines, vehicles and infantry. Optimized hyperspectral synthetic aperture radar would utilize a bandwidth and frequency range sufficient to encompass the resonant signatures of the targets of interest. It is desirable that the transmit bandwidth encompass and even extend beyond the resonant signatures of the targets of interest. Portions of the target impulse response falling outside of the transmitted radar signal will be significantly attenuated. It is of even greater importance that the receive bandwidth encompasses and extends beyond the spectral signature of the targets of interest. Portions of the target impulse response falling outside of the receiver bandwidth will be entirely lost. For spectral identification purposes, these targets dictate the use of frequencies ranging from a few tens of megahertz for land vehicles to several GHz for small landmines. Although any one mission may not be required to detect or identify such a wide range of targets, a system frequency range of 4 or 5 octaves and an instantaneous bandwidth of 3 octaves are desirable system characteristics. The hyperspectral synthetic aperture radar in accordance with this invention utilizes multi-resolution processing in order to utilize fine range resolution of short wavelength signals in conjunction with samples sufficiently spaced in range for detection of long wavelength signals. Back projection processing of the range compressed signal may use complex wavelet transforms or Hilbert transforms, for example. By this means spectral density of signals at short wavelengths (and generally smaller targets) may be mapped at a desirable high resolution, while the spectral density of long wavelengths (and generally larger targets) may be mapped at a necessarily lower resolution. The lower mapping resolution of larger targets is of less consequence simply because the targets are large. Azimuth resolution of the shorter wavelengths is enabled by the smaller antenna aperture at shorter wavelengths, resulting in higher resolution in both azimuth and range for shorter wavelengths.

In accordance with a further embodiment of this invention, a broad band horn antenna may be provided that allows air flow along at least one axis normal to the direction of signal propagation in order to minimize aerodynamic drag of the antenna when used for airborne SAR data collection.

In accordance with aspect of one embodiment of this invention, one or more of the antennas in accordance with this invention may be pivotably mounted to a SAR pod attached to an aircraft. The mounting position is preferably on the aft end of the pod in order to minimize deleterious effects on aircraft stability. A horn antenna is particularly well suited for low altitude SAR collects because it may be used to transmit impulse wave forms. Impulse waveforms may be efficiently generated with simple and lightweight pulse shaping circuits that may be readily carried on a small unmanned aerial vehicle (UAV).

In accordance with a further aspect of this invention, articulation of such a pod mounted antenna is by means of an aerodynamic control surface similar to an aileron or rudder, in conjunction with motion damping and locking means.

In accordance with a further aspect of this invention, a variety of transmitted chirps may be interleaved in time in order to obtain the necessary pulse repetition frequency (prf) for the higher azimuth resolution at higher frequencies while not wasting rf power on redundant low frequency transmissions. All chirps might include the high frequency end of the spectrum, with other chirps truncated in bandwidth (but not necessarily time) to eliminate various portions of the low frequency end of the transmitted spectrum. The same principle of tailoring the prf to frequency may be applied to other (non-chirp) waveforms such as Barker codes or folded chirps in accordance with this invention.

In accordance with a further aspect of this invention transmitted chirps, in the UHF and VHF bands for example, may be generated by switching of a higher frequency signal, 2.5 GHz for example. A 2.5 GHz signal may be efficiently generated with COTS microwave oven inverter technology. Switching is inherently more efficient than conventional amplification. Such a system is somewhat analogous to a variable frequency ac motor drive. Higher electrical efficiency allows for lower fuel burn, longer missions, and the use of smaller and cheaper platforms as well as unmanned platforms. A computer controlled switching scheme might advantageously be configured to simulate the function of a conventional amplifier by translating an incoming analog signal into required switching commands in order to generate a high power analog of the incoming analog signal.

BRIEF DESCRIPTION OF THE DRAWINGS

Note that the following drawings relate to one or more embodiments only and are not in any way to limit the invention, embodiments thereof, claims, or elements thereof. Other objects, advantages and capabilities of the present invention will become apparent as the description proceeds taken in conjunction with the following drawings in which:

FIG. 7 is the log periodic tripole array antenna of FIG. 4 further providing aerodynamically stiffened elements inclined to the direction of flight.

FIGS. 8a and 8b depict conventional aircraft antennas.

FIGS. 9a, 9b, 9c, and 9d depict an aircraft incorporating the log periodic tripole array antenna into each wing.

FIG. 11 illustrates a free body diagram of an aircraft banked for strip map mode SAR collection in straight level flight.

FIG. 12 illustrates retro-reflection of a radar signal by conventional vertical antenna elements.

FIG. 13 illustrates lack of retro-reflection by the LPTA antenna in accordance with this invention.

FIG. 17 illustrates a conventional single polarized "alpine horn" antenna.

FIG. 18 illustrates a dual polarized "alpine horn" antenna.

FIGS. 19a and 19b illustrate ½ of dual polarized "alpine horn" antenna assembly using aircraft wing as a mirror (reflector).

FIGS. 20a and 20b illustrate ½ of (dual polarized) Aerohorn™ antenna using aircraft wing as mirror (reflector).

FIG. 21 illustrates a conventional tapered slot antenna.

FIG. 22 illustrates the conventional dual polarized horn antenna installation in a radome on the belly of an aircraft.

FIG. 24b illustrates an electromagnetic model of the antenna and aircraft of FIG. 24a. FIG. 24c shows the antenna patterns computed from the model of FIG. 24b.

FIG. 26 illustrates a retractable dual polarized horn antenna.

DETAILED DESCRIPTION OF THE PREFERRED EMBODIMENTS

Figure 1:
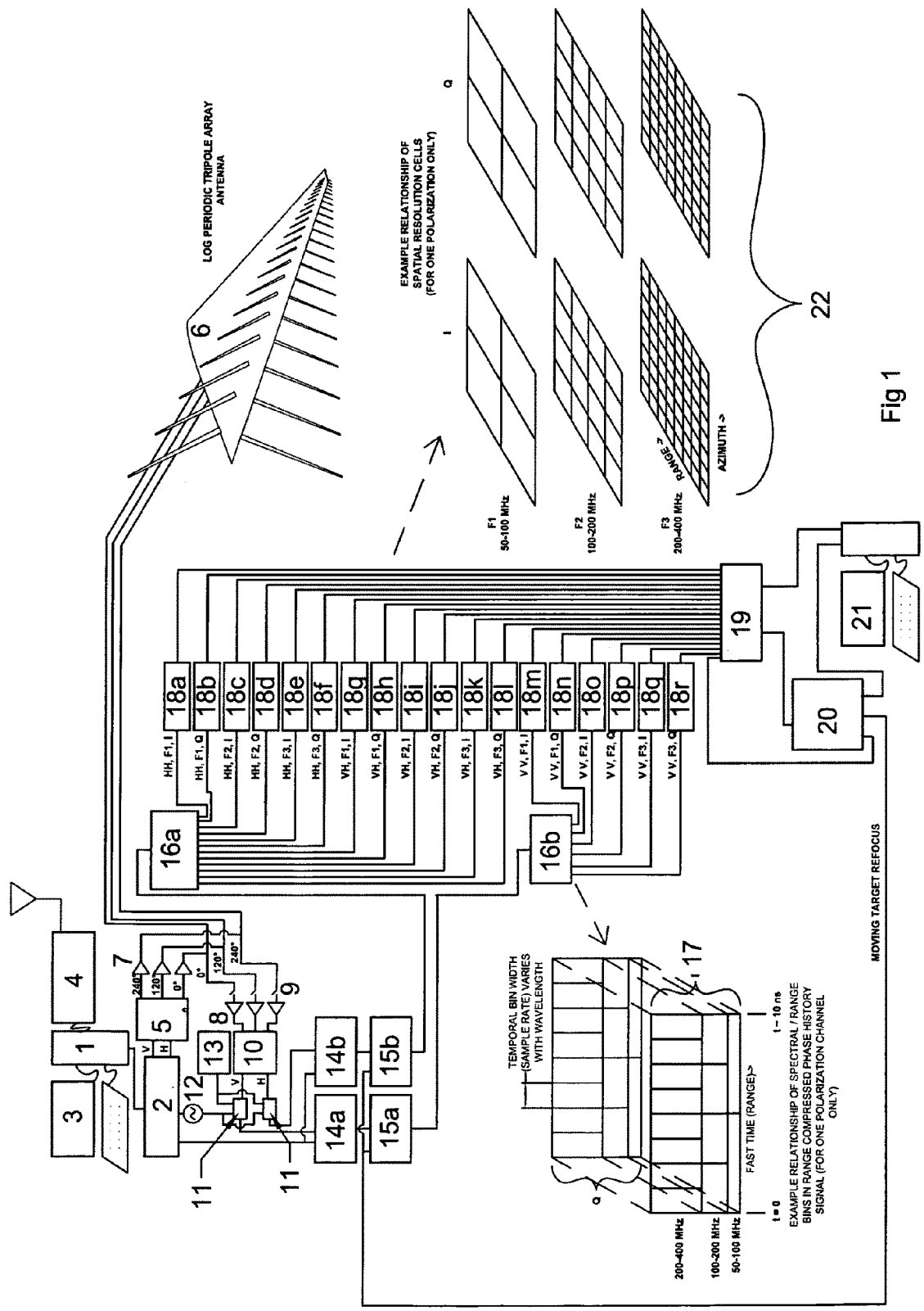
FIG. 1 is a schematic of a radar receiver in accordance with the present invention.

Referring to FIG. 1, a generalized schematic diagram for a spectrometric synthetic aperture radar system in accordance with the present invention is depicted. Controller computer 1 controls digital wave form generator 2 in response to radar collect parameters from operator interface 3 and interference and jamming receiver 4. Digital waveform generator 2 generates signals corresponding to the vertically and horizontally polarized signals, chirps for example, to be transmitted. Ortho to vector converter 5 translates the vertical and horizontal input signals into 0 degree, 120 degree, and 240 degree output signals needed to reproduce, as radio wave transmissions from the log periodic tripole array antenna (LPTA) 6, the desired polarization. Power amplifiers 7 (shown for simplicity as single stages of amplification) increase the signal level to the level desired for radar transmission. The received signals are fed to low noise amplifiers (LNAs) 8 through transmit-receive (T/R) switches 9. The 0 degree, 120 degree, and 240 degree signal components are then converted by the vector-to-ortho converter 10, utilizing a resistive bridge network for example, to conventional vertical and horizontal polarization components. The thus formed V and H signals are then converted to digital form by analog-to-digital (A/D) converters 11, taking into account a signal from the stabile local oscillator (STALO) 12 and navigational information from a navigation reference (NAV) 13 that may utilize, for example, a combination of GPS determined data and inertial navigation data. The digital signals may then be directed to range compression processors 14a and 14b. The range compressed signals may then be stored in buffer memories 15a and 15b so as to preserve sufficient phase history data to allow refocusing of moving targets that might only be discovered after the image of the surroundings of the moving targets has already been processed. The next processing step is undertaken by (complex) wavelet transform processors 16a and 16b which might be programmed to perform a number of alternative wavelet decompositions of the signals. A complex orthogonal wavelet tiling 17 is shown in the illustrated example signal format. The product of 3 frequency bins, 3 polarization channels and I and Q (In phase and Quadrature) channels is 18 signals to be imaged utilizing image processors 18a through 18r. It should be noted that many variations on the example shown are possible, such as coordinated focusing and noise filtering between processors. Additionally, six, for example, additional image layers could be created wherein all of the range compressed video signal might be allocated to range resolution while sacrificing, for the purpose these particular image layers, spectral discrimination. It may be useful, for certain applications, to map lower resolution spectral information onto higher range resolution panchromatic images. As mentioned previously in this application, the mapping of lower resolution color (spectral) data to higher resolution panchromatic aerial images has been successfully demonstrated in the form of Vexcel's (now Microsoft's) ULTRACAM® and is described in detail in U.S. Pat. No. 7,009,638 to Gruber et al. All of the resulting image layers may be stored in image storage system 19. The images may be simultaneously utilized by the automatic target detection (ATD) processor 20 and system users utilizing graphical user interface (GUI) 21. In the case of the illustrated example, the resolution cells 22 vary according to frequency bin as a result of the effects of (range resolution allocated) bandwidth on range resolution and the effects of (wavelength dependant) antenna aperture on azimuth resolution. Data and signals might at any stage of processing be transmitted to a remote platform or site. The allocation of processing, between that which might be done on the collecting platform versus that which might be done elsewhere, is, from a functional standpoint, somewhat arbitrary. On one hand, small fast lightweight processors are increasingly available. On the other hand, small UAVs are increasingly available that might best meet their disposability objective by carrying minimal processing equipment on board.

Figure 2B:
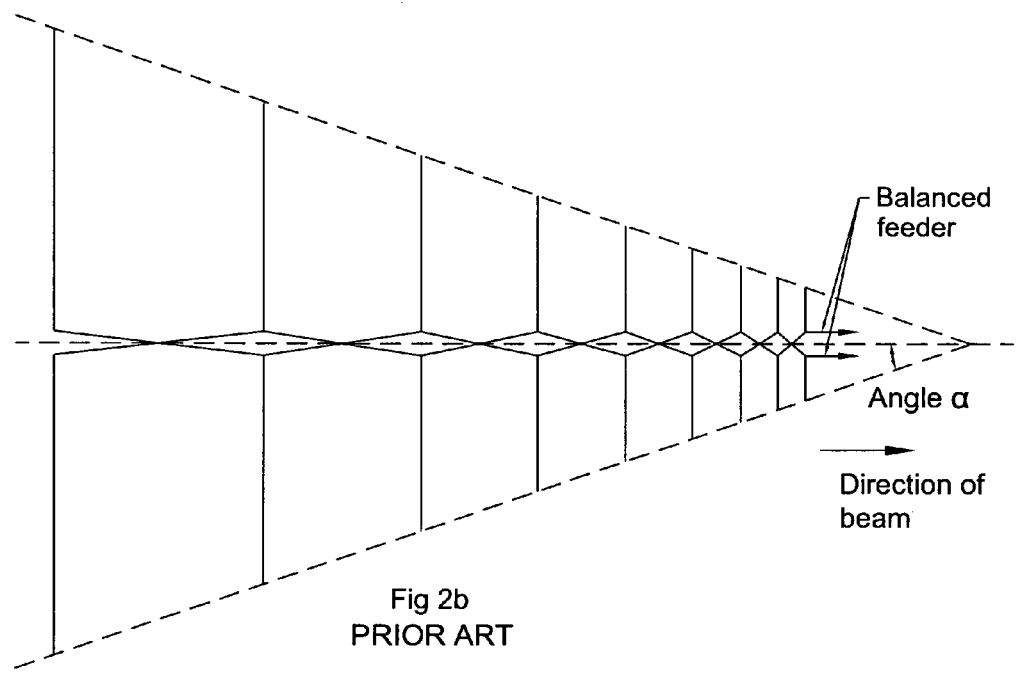
FIG. 2b is a schematic of a prior art log periodic array.
Figure 2A:
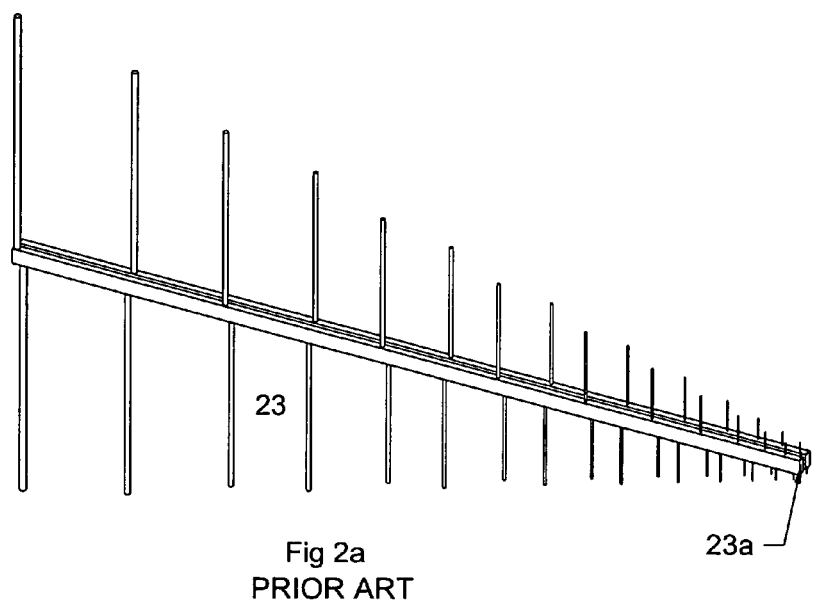
FIG. 2a is a prior art log periodic array antenna.

Referring now to FIGS. 2a and 2b, a conventional single polarized log periodic array antenna and its schematic, respectively, are shown. The feed is at the short wavelength end of the antenna.

Figure 3:
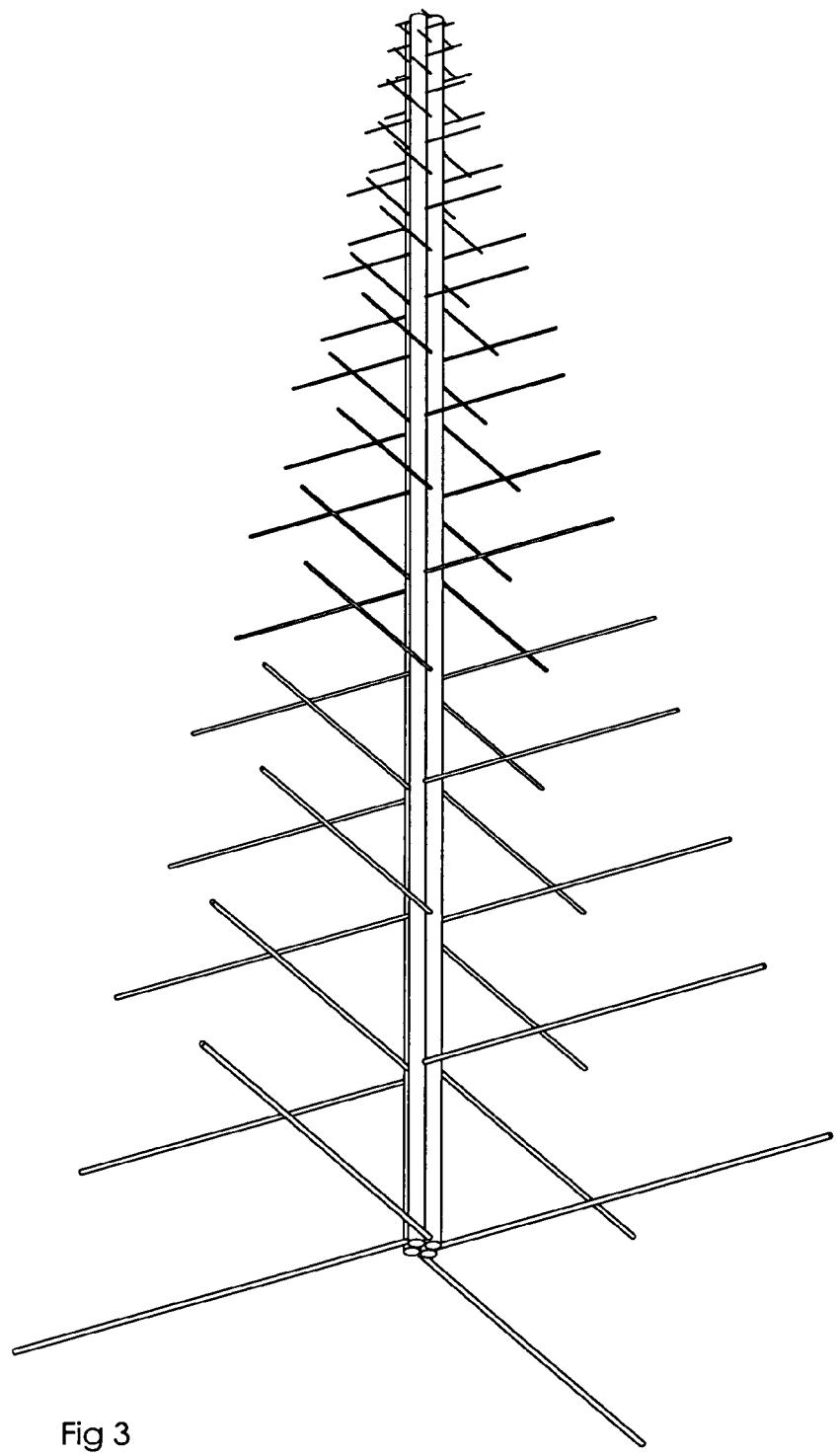
FIG. 3 is a prior art dual polarization log periodic dipole array antenna.

Referring now to FIG. 3, a dual polarized log periodic array antenna 24 is shown, consisting essentially of two single polarized log periodic array antennas superimposed at right angles. It is likely obvious to anyone familiar with aeronautical design that such a structure is ill suited to be flown sideways through the air at high speed. High drag and structural instability would be quickly followed by complete structural failure of the antenna assembly.

Figure 4:
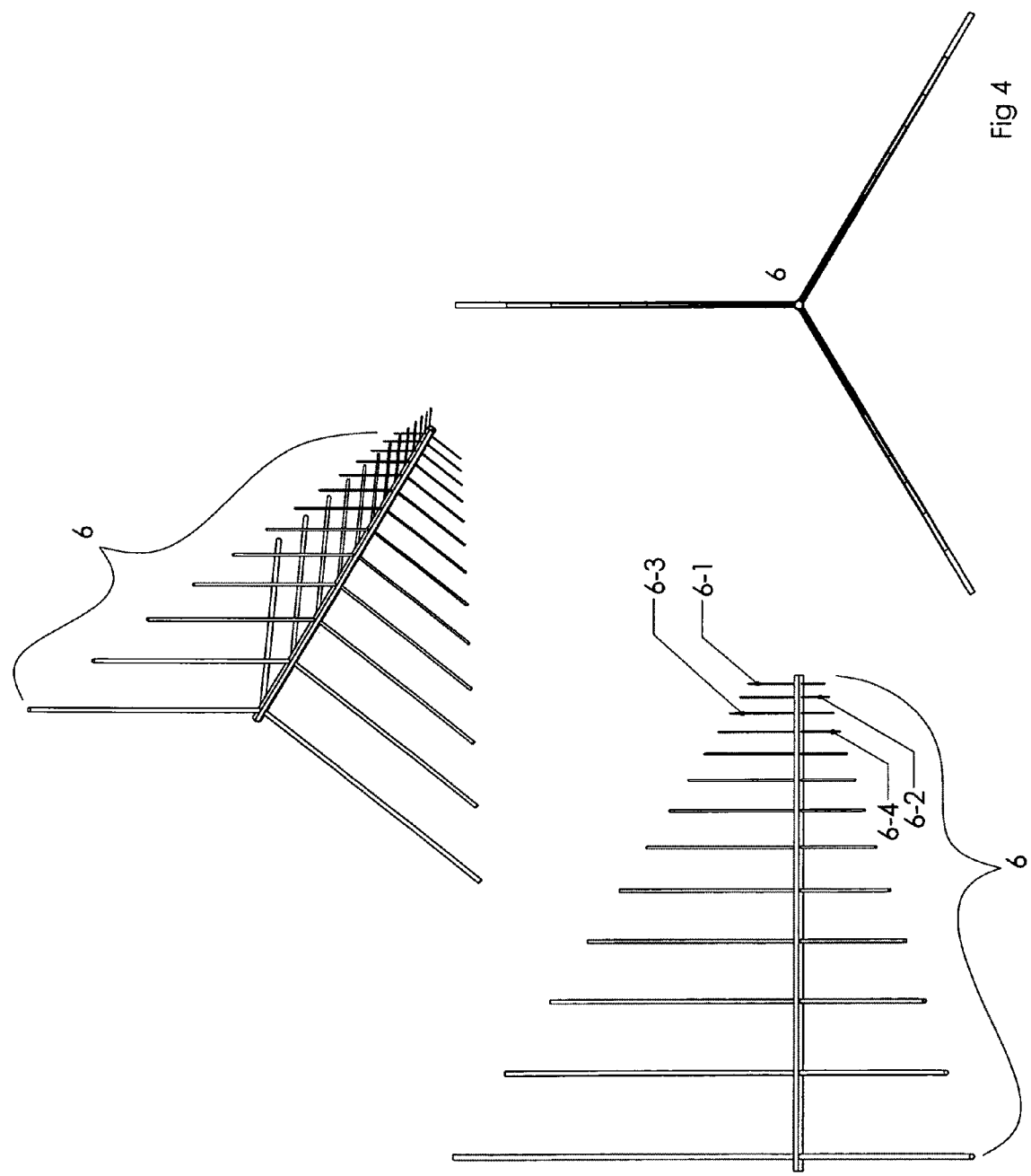
FIG. 4 is log periodic tripole array antenna in accordance with the present invention.
Figure 5:
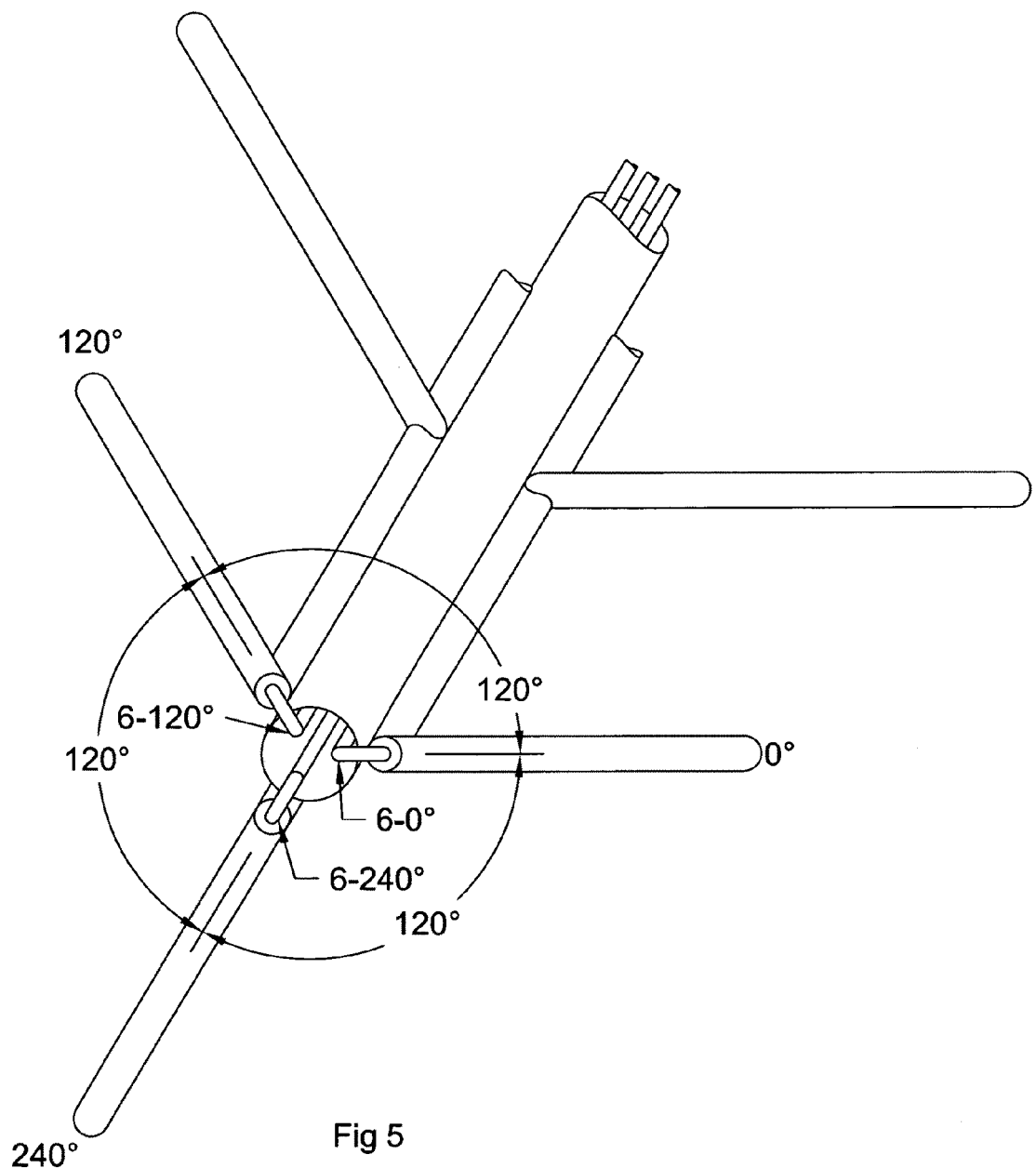
FIG. 5 is an electrical connection diagram for the LPTA in accordance with this invention.

Referring now to FIGS. 4 and 5, a log periodic tripole array (LPTA) antenna 6 in accordance with the present invention is shown. The elements 6-1, 6-2, 6-3, 6-4, etc. are spaced in rows each 120 degrees apart. Any desired polarization may be synthesized by coordinating the phase angles and amplitudes of each of the three individual antenna feeds 6-0 degree, 6-120 degree, and 6-240 degree.

Figure 6:
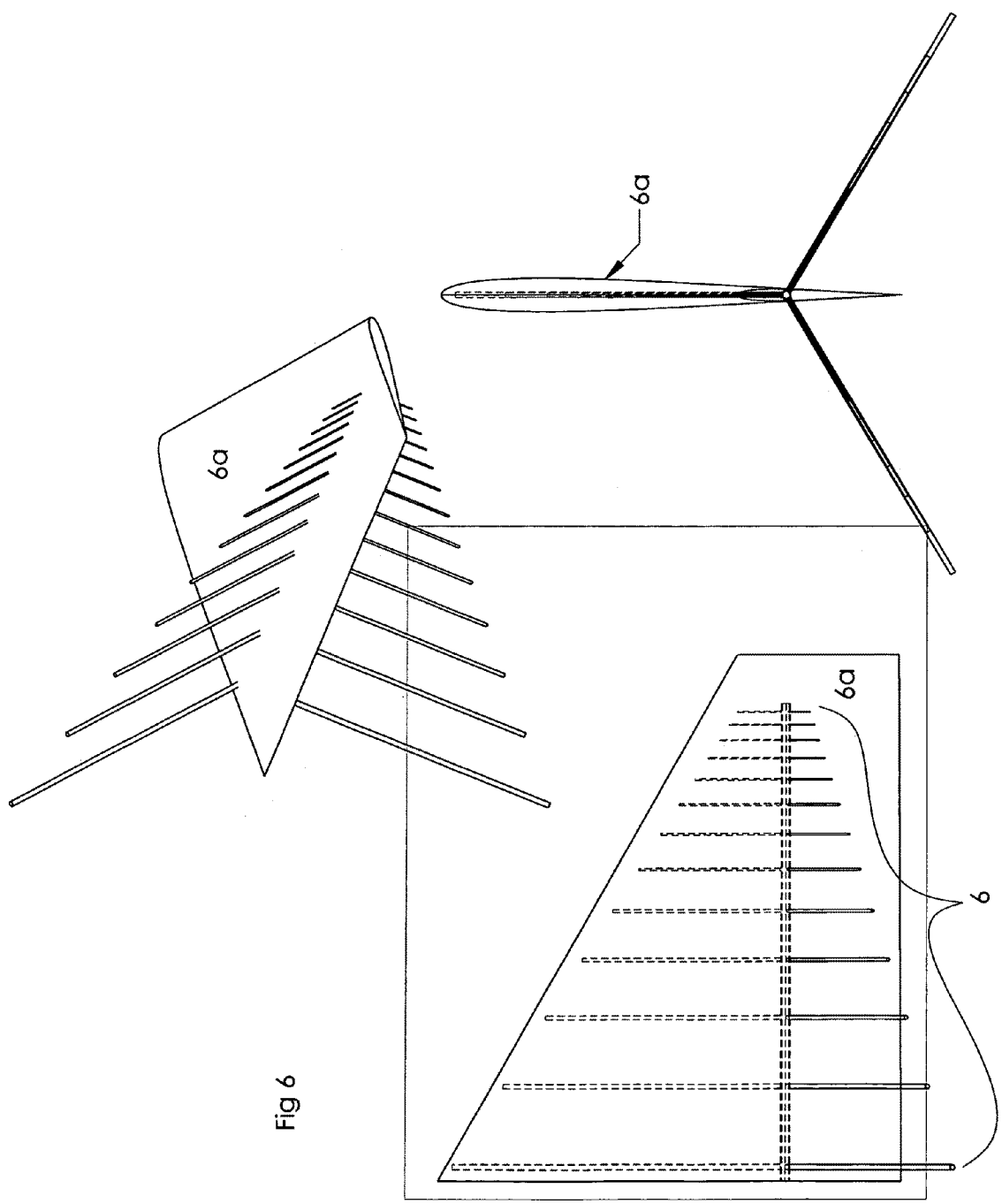
FIG. 6 is the log periodic tripole array antenna of FIG. 4 further incorporating the forward extending antenna elements into an airfoil.

Referring now to FIG. 6, the LPTA antenna 6 of FIG. 4 is again shown, but with the addition of an airfoil structure 6a aligned with and at least partially enclosing one row of antenna elements (hereinafter referred to as the 0 degree elements). The airfoil structure 6a is preferably made from an electrically insulating material such as a glass reinforced composite. It may incorporate voids or foam core materials, for example, within in order to achieve minimum weight. Carbon fiber might also be used if it were aligned parallel to the antenna axis only. The airfoil structure 6a will generally extend somewhat downwind of the antenna feed structure in order that the antenna feed structure may be completely contained within the thickness of the airfoil. That portion of the airfoil extending downwind of the antenna feed structure may incorporate aerodynamic control surfaces such as ailerons, flaps, rudders, or elevators, any of which may be widely articulated without interfering with the 120 degree and 240 degree antenna elements. In comparison, a conventional (single polarization) monopole array extending more or less horizontally aft of a wing would likely need to incorporate complicated and drag inducing brackets in order to allow articulation of the control surfaces that are collocated aft of the wing.

Referring now to FIG. 7, the LPTA antenna 6 of FIGS. 4 and 6 is again shown with 2 the further addition of individual airfoils 6b surrounding individual 120 degree and 240 degree antenna elements. The addition of airfoils surrounding the 120 degree and 240 degree antenna elements results: in reduced drag and enhanced aerodynamic stability of the individual antenna elements, as well as increased element strength. Von Karman vortex shedding, which causes destructive vibration of cylindrical surfaces normal to flow, is thus prevented. The general configuration of the individual elements conforms to conventional and proven aircraft antenna design practice. Conventional aircraft antennas are shown for comparative purposes in FIGS. 8a and 8b. The cross section of the element airfoils may be further increased to meet aircraft aerodynamic objectives if desired.

Figure 9A:
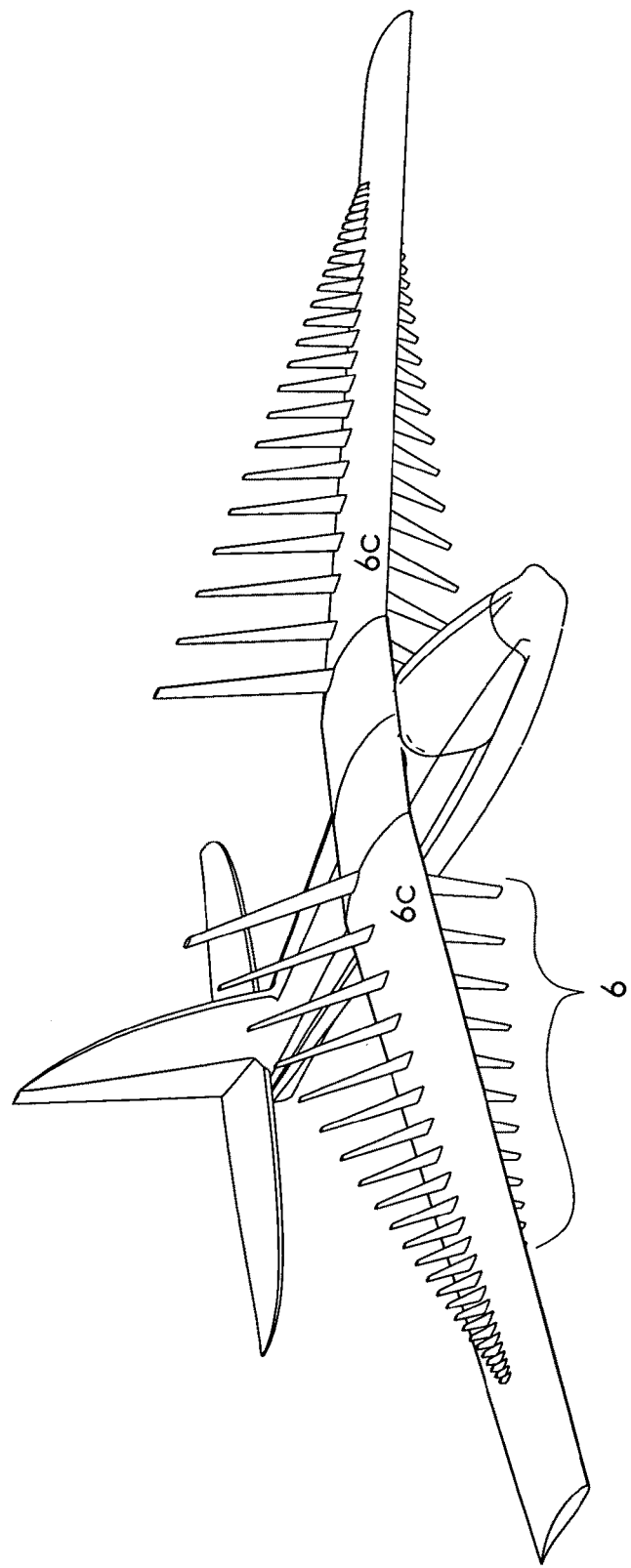
Figure 9B:
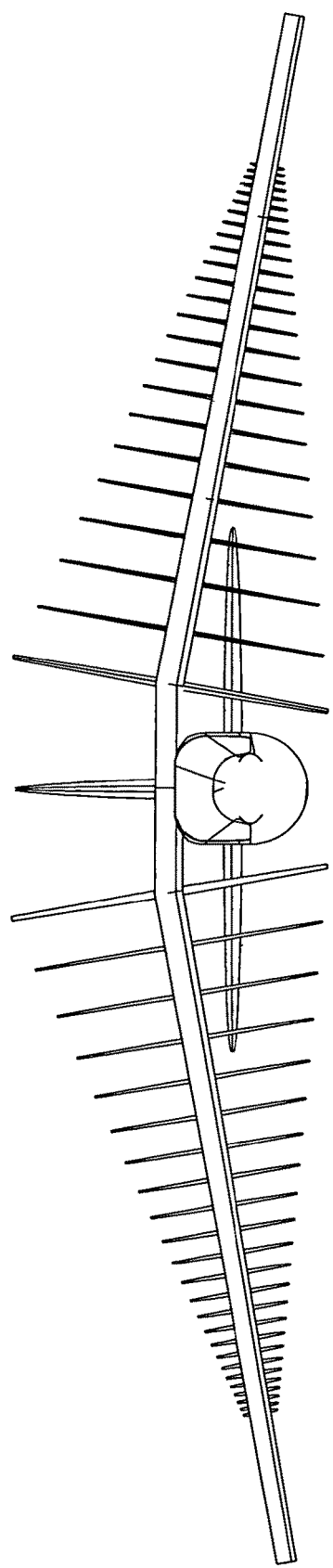
Figure 9C:
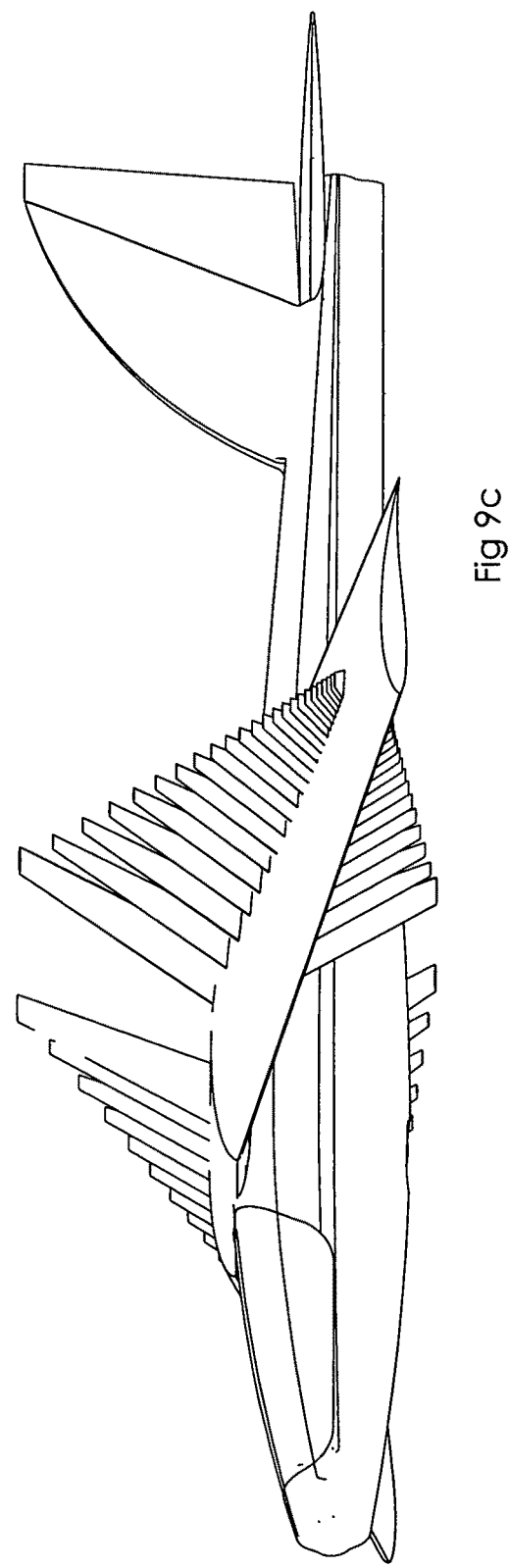
Figure 10A:
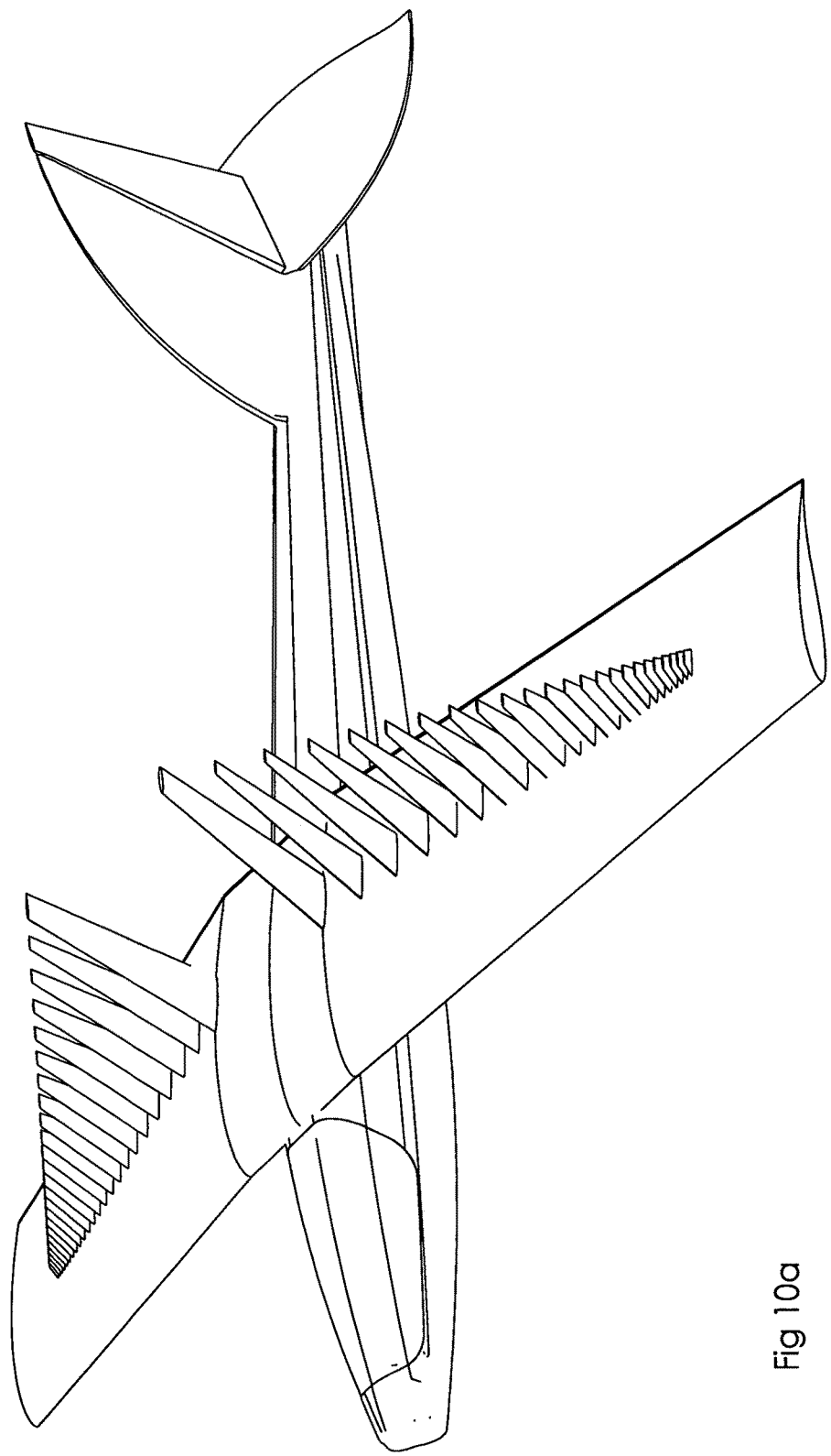
FIG. 10a is a test flight photo illustrating straight level flight with a 15 degree bank angle maintained by use of reverse rudder.
Figure 10B:
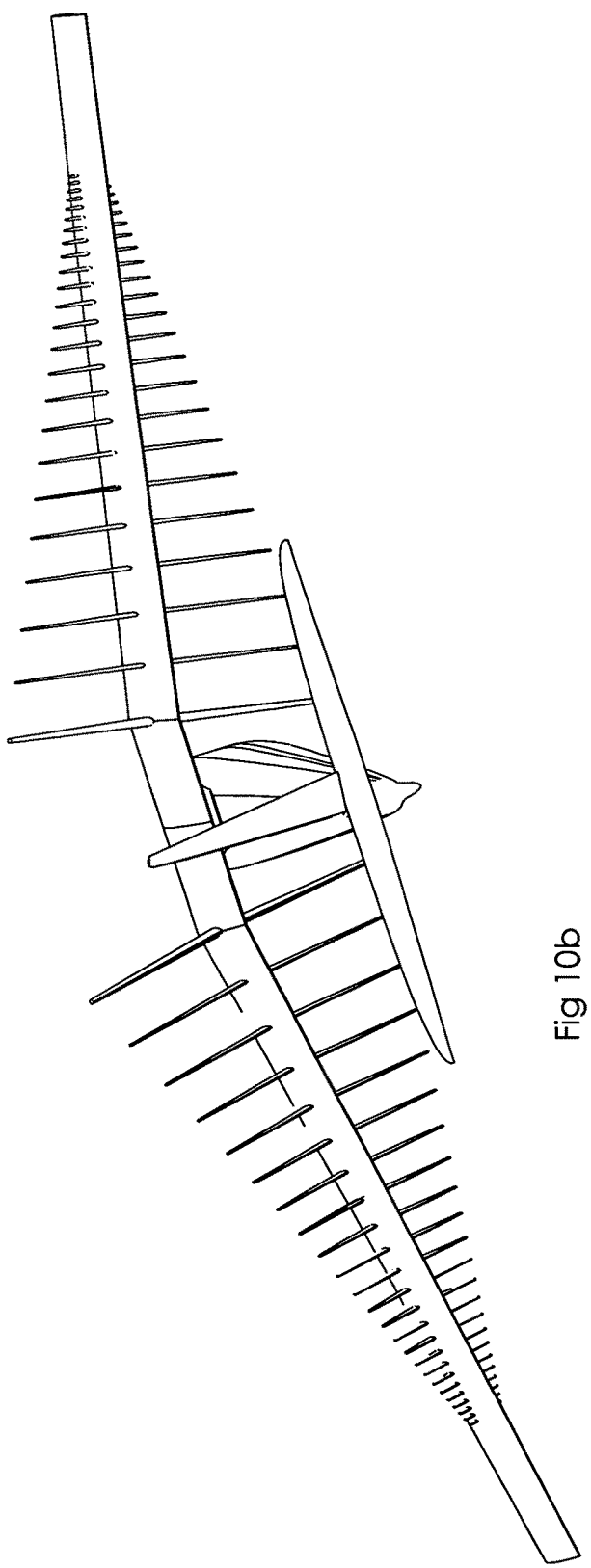
FIG. 10b, is a test flight photo illustrating the LPTA antenna.

Referring now to FIGS. 9a, 9 b, 9c, and 9d, the LPTA antenna 6 in accordance with this invention is shown incorporated into the (anhedral) wings 6c of an unmanned aerial vehicle (unmanned aircraft or UAV). This configuration allows, for a given size aircraft, a unique and desirable combination of low minimum frequency, large bandwidth, and relatively uniform gain over the bandwidth. Furthermore, the wing anhedral angle of approximately 10 degrees facilitates achieving useful and desirable antenna depression angles. As one example, an aircraft may be flown straight and level with zero bank angle while performing simultaneous left and right looking collects (preferably while alternating chirp direction between left and right). Alternatively, steeper depression angles may be achieved in straight level flight by crabbing the aircraft using reverse rudder as is shown in the photo of FIG. 10a in which is shown an antenna depression angle of approximately 25 degrees, near optimum for detection of targets hidden in trees. FIG. 10b is a photo revealing integration of the antenna and wing structures. The zero degree (forward facing elements are hidden within the wing structure.

Referring now to FIG. 11, a free body diagram of an aircraft in accordance with the present invention is shown. Although the bank angle results in a significant non-vertical (to the right) lift on the right wing, compensating aerodynamic forces to the left are provided by the 120 degree and 240 degree airfoil shaped antenna elements and the aircraft fuselage as a result of a slight (not shown in the Figure) aircraft crab angle. Spotlight mode or circle SAR collects may be accomplished by a conventionally coordinated turn and bank maneuver. Alternatively, the extra aerodynamic area provided by the 120 degree and 240 degree antenna elements provides a useful degree of independence of rate of turn, velocity, and bank angle, thus allowing somewhat independent determination of the turn geometry and the antenna depression angle.

Referring now to FIG. 12, an aircraft is shown with conventional vertically polarized antenna elements being illuminated by ground based air defense radar. As can be seen from the figure, the vertical antenna elements, in combination with either horizontal antenna elements or generally horizontal aerodynamic surfaces such as wings act as retro-reflectors with a greatly increased radar cross-section. The aircraft and antenna configuration shown in FIG. 13, by comparison, does not exhibit retro-reflectivity and therefore has a much lower radar cross section. Similar advantages of the present invention apply to its radar cross section as it relates to detection by airborne radars.

Certain applications may call for ultra wideband pulses in lieu of more elaborate signals such as fm chirps. Pulse based transmitters are generally cheaper and lighter, and may have better electrical efficiency. For operation at very close range, there may be insufficient time to transmit an ultra wideband chirp. Furthermore, at very close range, there may be insufficient time to allow ringing of a log periodic array to sufficiently decay before the echoed signal must be received. Such cases call for an ultra wideband impulse antenna, of which conventional ridged horn antennas are an example. Conventional ridged horn antennas are non-aerodynamically shaped and generally require a radome. A further object of this invention is to provide the spectrometric signal processing capability in accordance with this invention in an embodiment that is compatible with ultra wideband pulse transmission.

Referring to FIGS. 14a, 14b, 14c, and 14d, a dual polarized, low aerodynamic drag "Aerohorn™" antenna is shown. When each leaf is energized (A with C versus B with D) as tapered slot antennas, polarization is parallel to the flight path. When each leaf is energized as a TEM horn (A with B versus C with D), polarization is normal to the flight path.

Figure 14A:
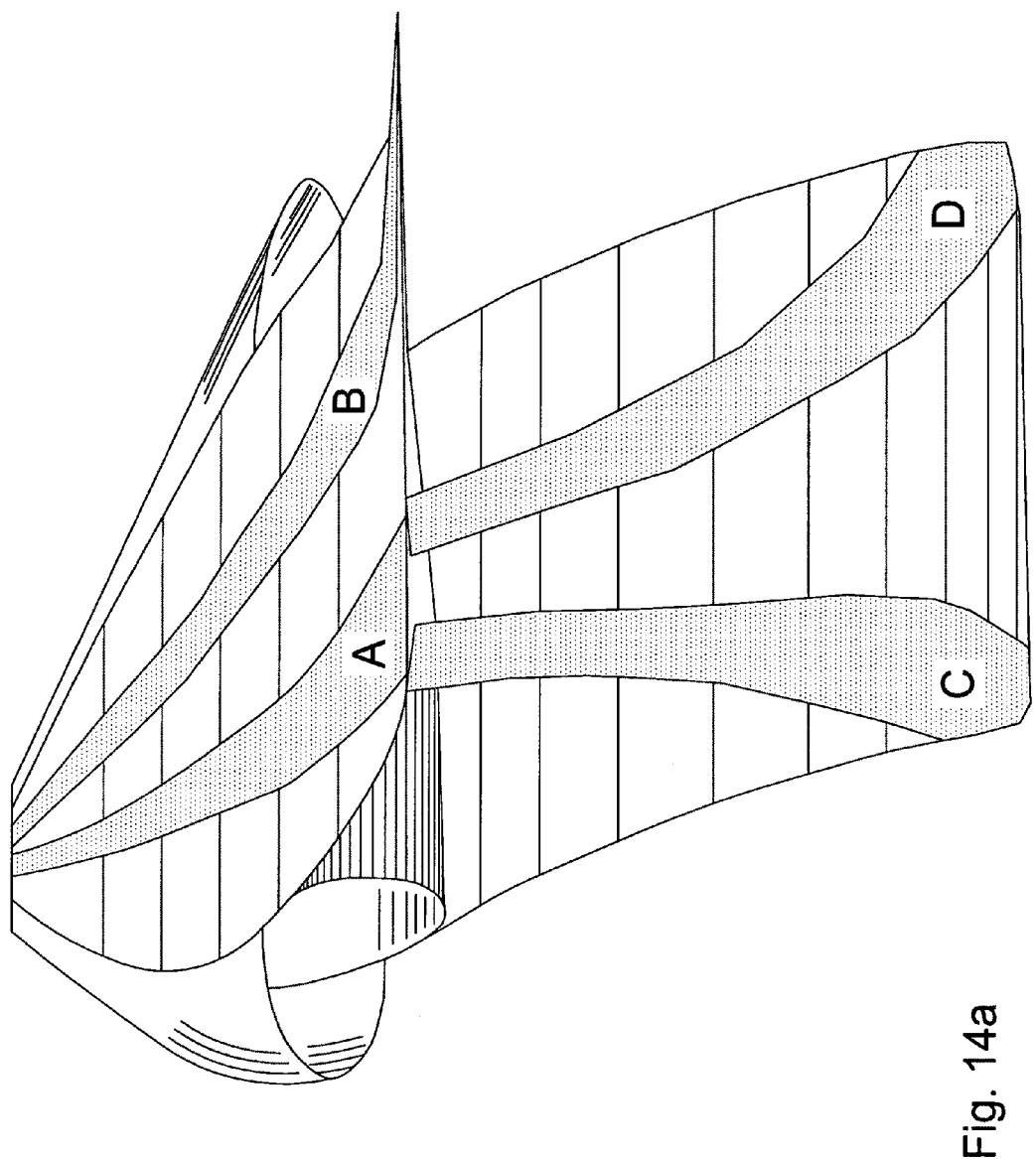
FIGS. 14a, 14b, 14c, and 14d illustrate an "Aerohorn™" antenna in accordance with the present invention.
Figure 14B:
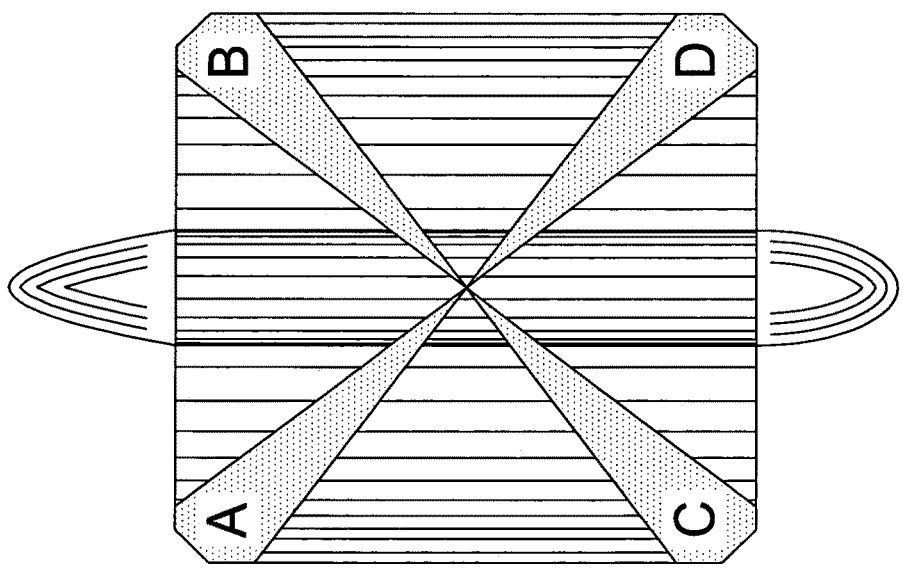

Referring to FIG. 14b, antenna conductors are shown as if the inside fairing were not obstructing the view. Antenna feed to each of the four terminals for A, B, C, and D is at the center of this view.

Figure 14C:
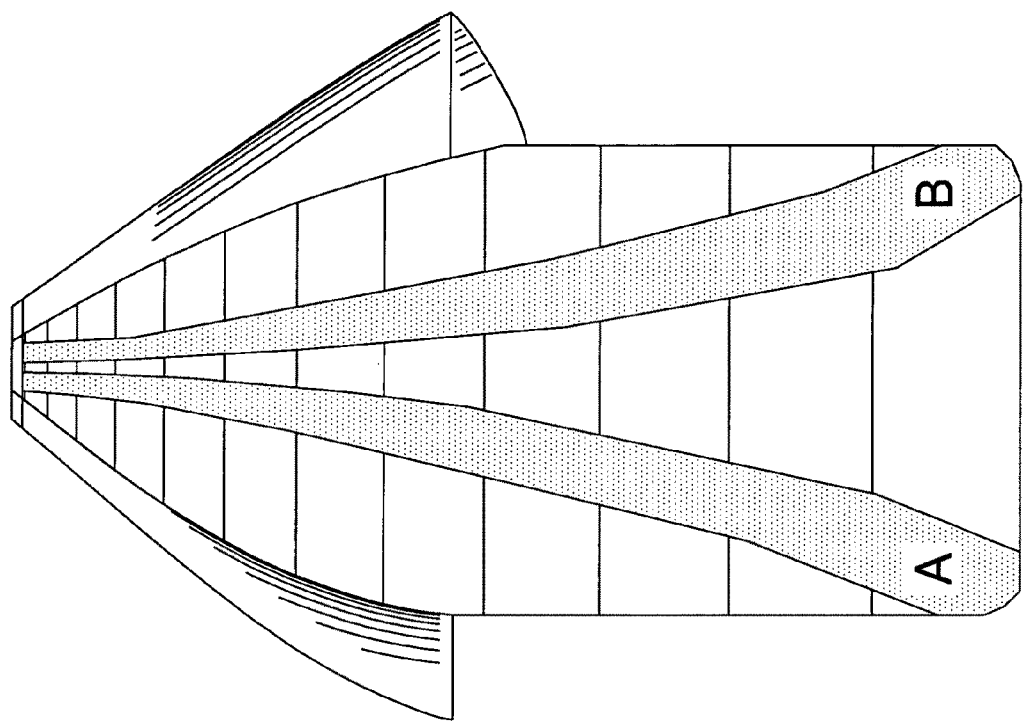

Referring now to FIG. 14c, the direction of flight is labeled. One of the two antenna leaves is shown as is the tapered slot antenna configuration of the individual leaf.

Figure 14D:
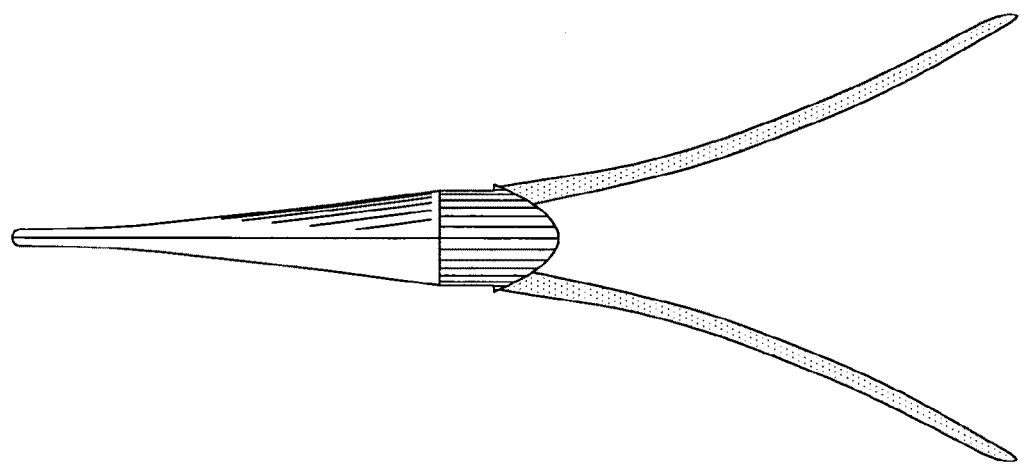

Referring now to FIG. 14d, a frontal view of the Aerohorn™ illustrating its low drag cross section is shown.

Figure 15:
FIGS. 15 and 16 illustrate an Aerohorn™ antenna installed on the aft end of a sensor pod on a UAV.

Referring now to FIG. 15, a UAV is shown with an Aerohorn™ pivotably mounted to the aft end of a SAR pod and oriented for SAR data collection. The pivotable mount allows for depression angle adjustment in both level and banked flight, allows for both right looking and left looking collects, and also allows the antenna to be stowed for take-off and landing to allow for ground clearance.

Figure 16:
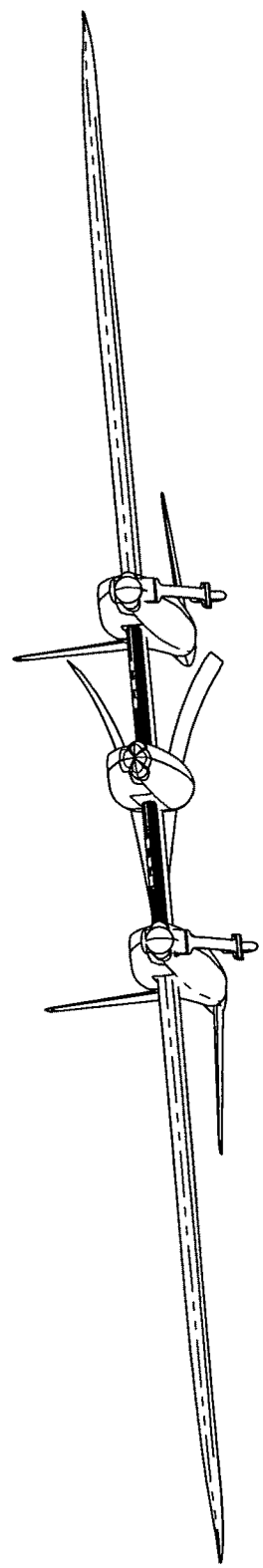

Referring to FIG. 16, a UAV with an Aerohorn™ pivoted to a generally horizontal landing configuration is shown.

Referring now to FIG. 17, a conventional "alpine horn" antenna is shown for reference.

Referring now to FIG. 18, the "alpine horn" antenna has been reconfigured for dual polarization and the axes of symmetry noted.

Referring now to FIGS. 19a and 19b, in accordance with a further aspect of this invention, one half of the dual polarized "alpine horn" antenna of FIG. 18 has been installed on an aircraft while utilizing the bottom cord of the aircraft wing as a mirror or reflector.

Referring no to FIGS. 20a and 20b, one half on an Aerohorn™ antenna is shown in conjunction with the bottom chord of an aircraft wing which serves as a mirror or reflector. Vertical polarization may be achieved by energizing the two antenna feeds together. Horizontal polarization may be achieved by energizing the two antenna feeds oppositely. Alternatively, The antenna and its reflector may be transposed in position, with the active antenna elements fixed in the plane of the wing and the reflector curving away from the wing. The downward curved element may be provided with flexibility so that it may be stowed flat against the wing when not being used for radar collects with the resulting advantages of lower drag, reduced radar cross-section, and general lack of visibility and obviousness.

Referring to FIG. 22, a conventional radome enclosed ridged horn antenna is shown for reference. Note the very large aerodynamic cross-section of the required radome compared to the aerodynamic cross-section of the Aerohorn™ of FIG. 14d.

Figure 23:
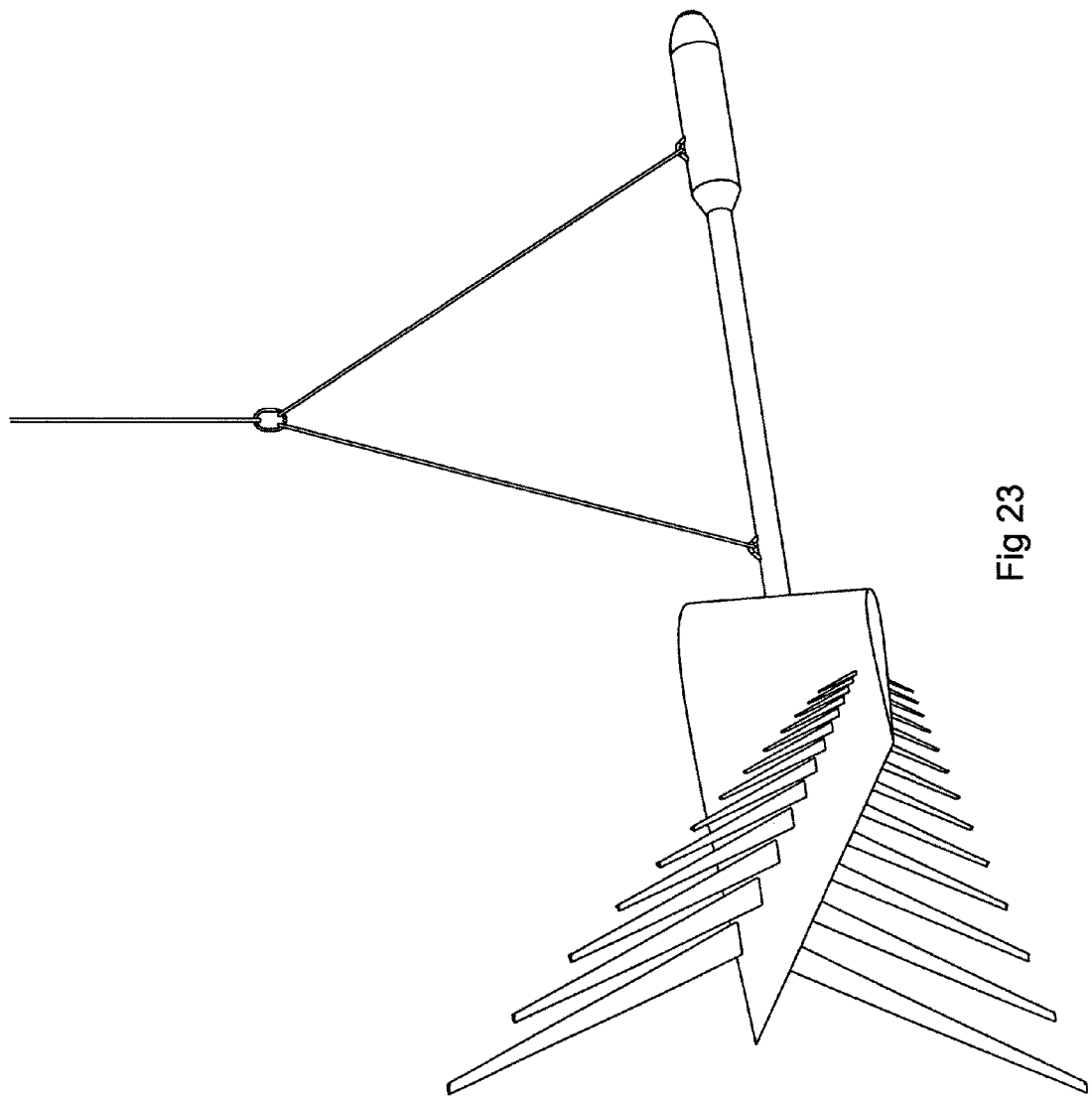
FIG. 23 illustrates an LPTA adapted for use as a suspended helicopter load.

Referring now to FIG. 23, a variant of the one embodiment of the present invention is shown wherein a LPTA in accordance with this invention is shown attached to a boom suspended from a helicopter. The LPTA is situated aft of the center of gravity to provide for directional stability of the suspended payload. The boom may enclose all or part of the SAR electronics associated with the LPTA antenna.

Figure 24A:
FIG. 24a illustrates a prior art log periodic monopole array antenna on an aircraft.

FIG. 24a shows a view of a prior art FOPEN SAR system associated with the DARPA WATCH-IT program.

The table below compares the prior art system of FIG. 24a with a hypothetical example spectrometric SAR system in accordance with the present invention.

| Spectral channels | Polarization | | |
|---|---|---|---|
| MHz | HH | VV | VH |
| 50-800 | Spectrometric SAR | Spectrometric SAR | Spectrometric SAR |
| 50-100 | Spectrometric SAR | Spectrometric SAR | Spectrometric SAR |
| 100-200 | Spectrometric SAR | Spectrometric SAR | Spectrometric SAR |
| 200-400 | Spectrometric SAR | Spectrometric SAR | Spectrometric SAR |
| 400-800 | Spectrometric SAR | Spectrometric SAR | Spectrometric SAR |
| 25-88 | WATCH-IT | | |
| 235-445 | WATCH-IT | WATCH-IT | WATCH-IT |

Deficiencies of the system shown in FIG. 24a compared to an exemplary system in accordance with the present invention include:
1) The VHF band is limited to horizontal polarization.
2) The UHF band antenna requires a radome of significant aerodynamic cross-section.
3) The effective aperture of the horn antenna array unnecessarily large at shorter wavelengths, resulting in reduced azimuth resolution.
4) There is no coverage between 52 MHz and 235 MHz.
5) There is no coverage above 445 MHz.
6) The VHF monopole array is attached to an anhedral wing. This results in the antenna beam pointing slightly skyward instead of downward an a near optimum depression angle.
7) The VHF monopole array requires brackets to allow articulation of the ailerons. This results in extra cost, weight, complexity and drag.
8) No spectral discrimination is provided except for the fact that two systems provide two images (plus two additional UHF only polarization images).

Referring to the flight test report, herein incorporated by reference, for a remotely piloted aircraft with log periodic tripole arrays incorporated into anhedral wings is shown.

Figure 24B:
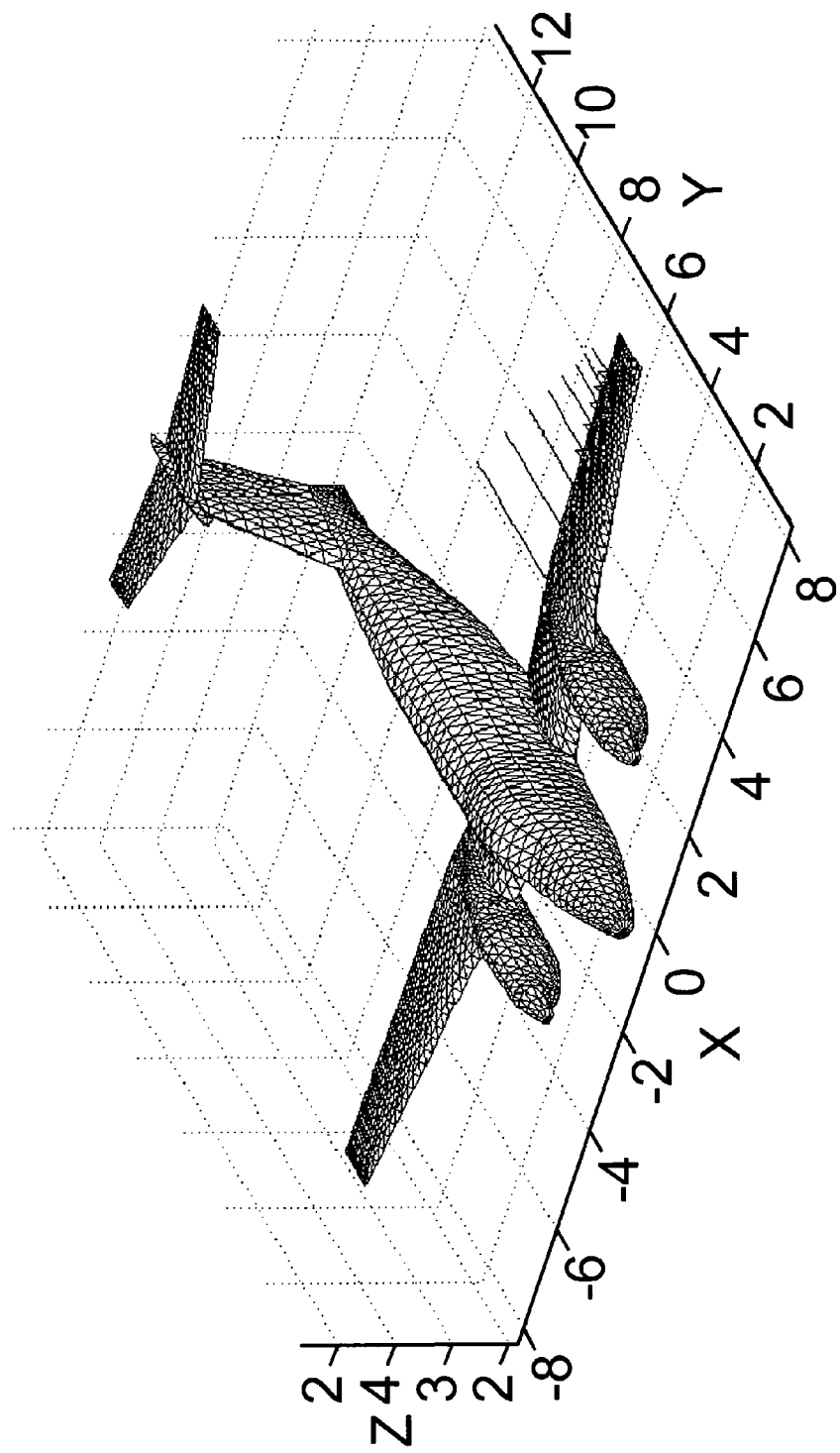
Figure 25:
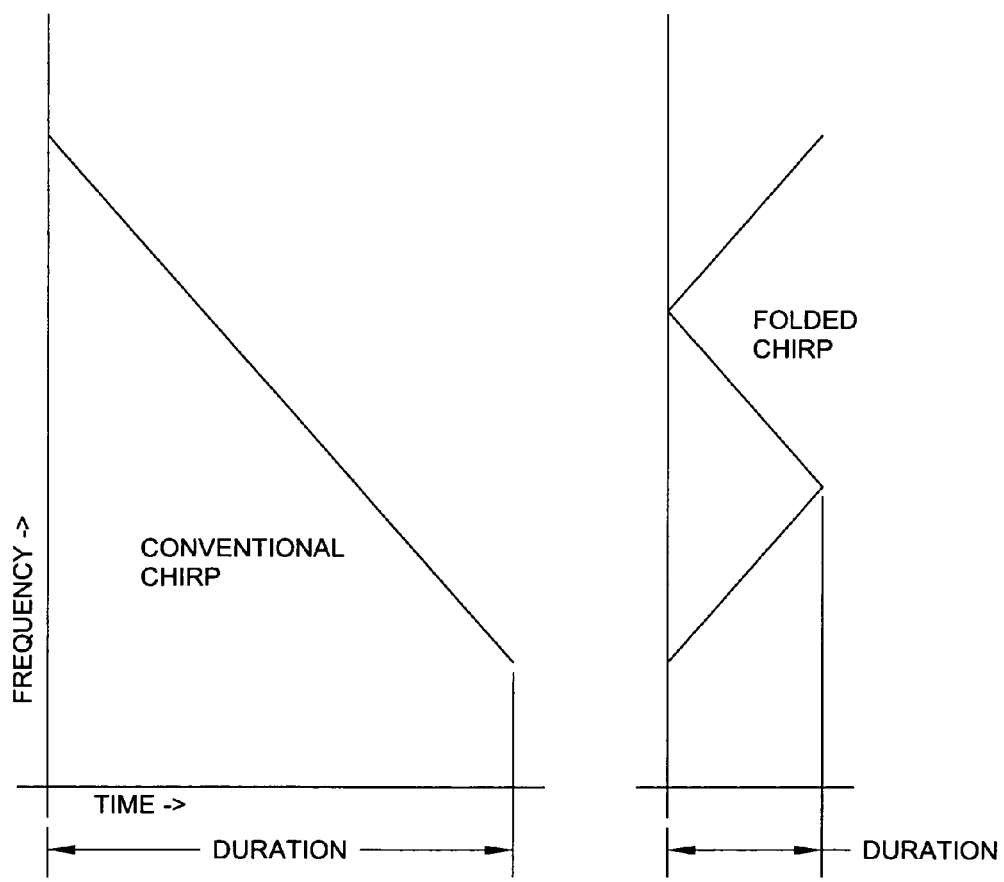
FIG. 25 reflects a folded chirp.

Referring to FIG. 24a, A log periodic monopole array in accordance with prior art is shown. Note that the dihedral angle of the aircraft wings results in an upward antenna beam depression angle ill suited for efficient SAR data collection. Complex brackets around the ailerons are also shown. FIG. 24b depicts an electromagnetic model of the aircraft and antennae shown in FIG. 24a. FIG. 24c shows the calculated antenna gain pattern for the antenna and aircraft at 88 MHZ. Referring now to FIG. 25, a folded chirp in accordance with the present invention is illustrated. The folded chirp has a shorter duration than a standard chirp and may be used to advantageously reduce the pulse repetition interval without exceeding allowable Voltage levels at the elements of the log periodic tripole array antenna. The pulse repetition interval must be sufficiently short to support fine azimuth resolution at short wavelengths.

Referring to FIGS. 26a through 26e, a retractable dual polarized horn antenna is illustrated. FIG. 26a illustrates the relationship between a flexible antenna element mounted to wing 28. Actuator 29 moves cable 30 around pulley 31 in order to retract antenna 27 for non-radar collect flight. The exposed surface of the retracted antenna may incorporate radar absorbing material in order to minimize platform aircraft detectability. Wing 28 serves as a reflector for antenna 27.

As can be easily understood from the foregoing, the basic concepts of the present invention may be embodied in a variety of ways. It involves synthetic aperture radar systems, antennas, and aircraft platforms as well as devices to accomplish the collection of synthetic aperture radar images. In this application, the synthetic aperture radar techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims included in this patent application.

It should also be understood that a variety of changes may be made without departing from the essence of the invention. Such changes are also implicitly included in the description. They still fall within the scope of this invention. A broad disclosure encompassing the explicit embodiment(s) shown, the great variety of implicit alternative embodiments, and the broad methods or processes and the like are encompassed by this disclosure and may be relied upon for the claims for this patent application. It should be understood that such language changes and broad claiming is accomplished in this filing. This patent application will seek examination of as broad a base of claims as deemed within the applicant's right and will be designed to yield a patent covering numerous aspects of the invention both independently and as an overall system.

Further each of the various elements of the invention and claims may also be achieved in a variety of manners. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates.

Regarding this last aspect, as but one example, the disclosure of a "means for spectral discrimination" or a "filter" should be understood to encompass disclosure of the act of "filtering"—whether explicitly discussed or not—and, conversely, were there is effectively disclosure of the act of "filtering", such a disclosure should be understood to encompass disclosure of a "filter" and even a "means for filtering". Such changes and alternative terms are to be understood to be explicitly included in the description.

Any acts of law, statutes, regulations, or rules mentioned in this application for patent' or patents, publications, or other references mentioned in this application for patent are hereby incorporated by reference. In addition, as to each term used it should be understood that unless its utilization in this application is inconsistent with such interpretation, common dictionary definitions should be understood as to incorporated for each term and all definitions, alternative terms, and synonyms such as contained in the Random House Webster's Unabridged Dictionary, second edition are hereby incorporated by reference Finally, all references listed in the list of References To be Incorporated By Reference In Accordance With The Patent Application or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to claim at least i) each of the water control actuator devices as herein disclosed and described, ii) the related methods disclosed and described, iii) similar, equivalent, and even implicit variations of each of these devices and methods, iv) those alternative designs which accomplish each of the functions shown as re disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, and ix) methods and apparatuses substantially as described hereinbefore and with reference to any of the accompanying examples, x) the various combinations and permutations of each of the elements disclosed, and xi) each potentially dependent claim or concept as a dependency on each and every one of the independent claims or concepts presented. In this regard it should be understood that for practical reasons and so as to avoid adding potentially hundreds of claims, the applicant may eventually present claims required under new matter laws—including but not limited to European Patent Convention Article 123(2) and United States Patent Law 35UC 132 or other such laws—to permit the addition of any of the various dependencies or other elements presented under one independent claim or concept as dependencies or elements under any other independent claim or concept. Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible.

What is claimed is:

1. A log periodic tripole antenna comprising:
   three log periodic monopole arrays positioned with the feeds parallel,
   wherein said arrays comprise rows of antenna elements,
   and wherein said rows are spaced 120 degrees apart; and
   an airfoil at least partially enclosing one of said rows on antenna elements.

2. The log periodic tripole antenna array of claim 1 wherein said airfoil comprises a lifting, stabilizing, or control surface.

3. The log periodic tripole antenna array of claim 2 wherein said airfoil is a wing.

4. The log periodic tripole antenna array of claim 3 wherein said airfoil is an anhedral wing.

5. The log periodic tripole antenna array of claim 4 further comprising an airfoil enclosure enclosing one of said arrays.

6. The log periodic tripole antenna array of claim 5 wherein said airfoil enclosure comprises an aircraft lifting or control surface.

7. The log periodic tripole antenna array of claim 6 wherein said airfoil enclosure is a wing.

8. The log periodic tripole array in accordance with claim 7 wherein said airfoil enclosure comprises an anhedral wing.

9. The log periodic tripole array of claim 8 wherein the said antenna elements have a vertical surface area in excess of that needed for structural stability.

10. The log periodic tripole array of claim 9 wherein said airfoil enclosure is a wing that include horizontal surface in excess of that needed to surround the antenna elements of said array which is enclosed by said airfoil enclosure.

11. The log periodic tripole array of claim 8 further comprising an additional antenna element and wherein said additional antenna element comprises an aircraft fuselage.

12. The log periodic tripole array of claim 8 further comprising stiffening elements, wherein said stiffening elements strengthen said log periodic tripole array to facilitate its use on an aircraft with a radome.

13. The log periodic tripole array of claim 9 wherein said anhedral wing has been aerodynamically shaped to facilitate its use on an aircraft without a radome.

14. The log periodic tripole array of claim 10 further comprising an internal stiffener and fairing to facilitate its attachment to the rear of an aircraft or aircraft mounted pod.

15. An ultra wideband polarimetric synthetic aperture radar system (SAR) comprising:
   a transmitter, at least one antenna, at least one coherent receiver, at least one range compression processor which creates a complex range compressed phase history signal, at least one wavelet transform processor, and at least one azimuth processor, wherein said complex range compressed phase history signal is decomposed by complex wavelet transformation into at least two spectrally distinct range compressed phase history signals and wherein at least two spectrally distinct range compressed phase history signals are then separately azimuth processed into layers of a common image, and wherein said synthetic aperture radar system may be utilized as an inverse synthetic aperture radar (ISAR).

16. The ultra wideband polarimetric synthetic aperture radar system of claim 15 wherein said spectral image layers comprise at least two octaves.

17. The ultra wideband polarimetric synthetic aperture radar system of claim 15 wherein said spectral image layers comprise at least three octaves.

18. The ultra wideband polarimetric synthetic aperture radar system of claim 15 wherein said spectral image layers comprise at least four octaves.

19. The ultra wideband polarimetric synthetic aperture radar system of claim 15, wherein said separate spectral image layers are mapped onto a higher resolution panchromatic image layer.

20. The ultra wideband polarimetric synthetic aperture radar system of claim 15, further comprising at least three polarimetric channels and wherein separate spectral image layers are generated for each of said at least three polarimetric channels, and wherein all of said separate spectral image layers generated for each of said at least three polarimetric channels are mapped onto a higher resolution panchromatic image layer.

21. The ultra wideband polarimetric synthetic aperture radar system of claim 15, further comprising automatic target detection based on covariant polarimetric and spectral signatures.

22. The ultra wideband polarimetric synthetic aperture radar system of claim 15, wherein said spectrometric inverse synthetic aperture radar utilizes an instantaneous bandwidth of at least two octaves.

23. A Synthetic Aperture Radar (SAR) in accordance with claim 15, wherein the spectral content due to non-linear target behavior is isolated from the balance of the target spectral content.

24. The ultra wideband polarimetric synthetic aperture radar system of claim 15, further comprising an instantaneous bandwidth of at least two octaves and using folded chirps.

\* \* \* \* \*